United States Patent
Zhou et al.

(10) Patent No.: US 11,770,826 B2
(45) Date of Patent: Sep. 26, 2023

(54) CANDIDATE TRANSMISSION CONFIGURATION INFORMATION STATES FOR SLOT AGGREGATION

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Kiran Venugopal, Raritan, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/236,777

(22) Filed: Apr. 21, 2021

(65) Prior Publication Data
US 2021/0243783 A1   Aug. 5, 2021

Related U.S. Application Data

(63) Continuation of application No. 16/549,157, filed on Aug. 23, 2019, now Pat. No. 11,057,915.
(Continued)

(51) Int. Cl.
*H04W 72/12* (2023.01)
*H04W 72/1273* (2023.01)
(Continued)

(52) U.S. Cl.
CPC ....... *H04W 72/1273* (2013.01); *H04W 72/23* (2023.01); *H04W 76/20* (2018.02)

(58) Field of Classification Search
CPC .............................. H04W 72/12; H04W 76/20
See application file for complete search history.

(56) References Cited

U.S. PATENT DOCUMENTS

2019/0103908 A1\* 4/2019 Yu ........................ H04B 7/0695
2019/0141693 A1\* 5/2019 Guo .................... H04W 72/042
(Continued)

FOREIGN PATENT DOCUMENTS

WO   WO2018064313 A1   4/2018

OTHER PUBLICATIONS

ASUSTEK: "Remaining Issues on Beam Management", 3GPP TSG RAN WG1 Meeting #92bis, 3GPP Draft; R1-1804035 Remaining Issues on Beam Management, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, XP051426324, 5 pages, Retrieved from the Internet: URL: http://www.3gpp.org/ftp/Meetings%5F3GPP%5FSYNC/RAN1/Docs/ [retrieved on Apr. 15, 2018] Section 3—conclusions; page fourth-page fifth.
(Continued)

*Primary Examiner* — Zhiren Qin

(74) *Attorney, Agent, or Firm* — Heejong Yoo

(57) ABSTRACT

Methods, systems, and devices for wireless communications are described. A user equipment (UE) may determine, during a multi-slot downlink transmission, that a mapping from a transmission configuration information (TCI) state index to a first TCI state configuration has changed to a second TCI state configuration. The UE may select, based at least in part on the determined change, the first TCI state configuration or the second TCI state configuration to use for at least a portion of the multi-slot downlink transmission. The UE
(Continued)

may receive the multi-slot downlink transmission during one or more slots according to the selected TCI state configuration and the TCI state index.

14 Claims, 17 Drawing Sheets

Related U.S. Application Data

(60) Provisional application No. 62/811,998, filed on Feb. 28, 2019, provisional application No. 62/811,418, filed on Feb. 27, 2019, provisional application No. 62/725,128, filed on Aug. 30, 2018.

(51) Int. Cl.
*H04W 76/20* (2018.01)
*H04W 72/23* (2023.01)

(56) References Cited

U.S. PATENT DOCUMENTS

| | | | | |
|---|---|---|---|---|
| 2019/0281587 | A1* | 9/2019 | Zhang | H04W 72/10 |
| 2019/0306924 | A1* | 10/2019 | Zhang | H04L 5/0094 |
| 2019/0320469 | A1* | 10/2019 | Huang | H04W 72/14 |
| 2019/0349964 | A1* | 11/2019 | Liou | H04W 72/046 |
| 2020/0008228 | A1 | 1/2020 | Lee et al. | |
| 2020/0053757 | A1* | 2/2020 | Bagheri | H04L 5/0035 |
| 2020/0077428 | A1 | 3/2020 | Zhou et al. | |
| 2020/0120584 | A1* | 4/2020 | Yi | H04L 5/005 |
| 2020/0252241 | A1* | 8/2020 | Park | H04L 25/0224 |
| 2020/0389883 | A1* | 12/2020 | Faxér | H04L 5/0025 |
| 2020/0395988 | A1* | 12/2020 | Lee | H04L 5/0057 |
| 2020/0403682 | A1* | 12/2020 | Koskela | H04W 80/02 |
| 2021/0306996 | A1* | 9/2021 | Matsumura | H04W 24/10 |

OTHER PUBLICATIONS

International Preliminary Report on Patentability—PCT/US2019/048118, The International Bureau of WIPO—Geneva, Switzerland, dated Mar. 11, 2021.
International Search Report and Written Opinion—PCT/US2019/048118—ISA/EPO—dated Feb. 19, 2020.
Partial International Search Report—PCT/US2019/048118—ISA/EPO—dated Nov. 15, 2019.
QUALCOMM Incorporated: "Beam Management for NR", 3GPP TSG RAN WG1 Meeting #92bis, 3GPP Draft; R1-1804787 Beam Management for NR, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 8 Pages, XP051427054, Retrieved from the Internet: URL: http://www.3gpp.org/ftp/Meetings_3GPP_SYNC/RAN1/Docs/ [retrieved on Apr. 15, 2018], Section 14.
QUALCOMM: "Summary of Beam Mgmt", 3GPP TSG RAN WG1 Meeting #91, 3GPP Draft; R1-1721696 Summary of Beam Mgmt, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Dec. 4, 2017, XP051370775, 14 Pages, Retrieved from the Internet: URL: http://www.3gpp.org/ftp/tsg%5Fran/WG1%5FRL1/TSGR1%5F91/Docs/ [retrieved on Dec. 4, 2017] Sections 2.2-2.4.
ERICSSON: "Feature Lead Summary Beam Management", 3GPP TSG-RAN WG1 Meeting #94, Tdoc R1-1809759, Gothenburg, Aug. 20-24, 2018, 23 Pages, Chapters 3.1, 3.4, 3.4.1, 3.6, 3.7 and 3.8.
Taiwan Search Report—TW108130450—TIPO—Dec. 22, 2022.
ZTE: "Maintenance for Beam Management", 3GPP TSG RAN WG1 Meeting #94, R1-1808196, Gothenburg, Sweden, Aug. 20-24, 2018, 10 Pages, Chapters 2.1 and 2.2.1.

* cited by examiner

CANDIDATE TRANSMISSION CONFIGURATION INFORMATION STATES FOR SLOT AGGREGATION

The present application for patent is a continuation of U.S. patent application Ser. No. 16/549,157 by Zhou, et. al., entitled "CANDIDATE TRANSMISSION CONFIGURATION INFORMATION STATES FOR SLOT AGGREGATION," filed Aug. 23, 2019, which claims the benefit of U.S. Provisional Patent Application No. 62/725,128 by ZHOU, et al., entitled "CANDIDATE TRANSMISSION CONFIGURATION INFORMATION STATES FOR SLOT AGGREGATION," filed Aug. 30, 2018, and to U.S. Provisional Patent Application No. 62/811,418 by ZHOU, et al., entitled "CANDIDATE TRANSMISSION CONFIGURATION INFORMATION STATES FOR SLOT AGGREGATION" filed Feb. 27, 2019, and to U.S. Provisional Patent Application No. 62/811,998 by ZHOU, et al., entitled "CANDIDATE TRANSMISSION CONFIGURATION INFORMATION STATES FOR SLOT AGGREGATION" filed Feb. 28, 2019, assigned to the assignee hereof, and expressly incorporated herein.

INTRODUCTION

The following relates generally to wireless communications, and more specifically to techniques that support configuring candidate transmission configuration information (TCI) states for wireless communications between a base station and user equipment (UE) that uses slot aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

Wireless communications systems may use various configurations to support wireless transmissions/receptions. For example, the configurations may be used to select or otherwise identify various parameters to be used for the wireless communications. Examples of the parameters may include, but are not limited to, the transmit power for the transmissions, modulation and coding schemes (MCS), rate matching information, and the like. In a millimeter wave (mmW) network, configuration parameters may further include spatial relation information, e.g., beam direction, beam identifier, spatial stream, and the like. Generally, the configuration parameters may be updated as needed, periodically, etc. However, changes to the configuration parameters may impact ongoing communications. For example, changes to the configuration parameters that occur during an ongoing downlink or uplink transmission may disrupt the transmission, which may result in a loss of communication, may increase latency, may decrease reliability, and the like.

SUMMARY

A method of wireless communication at a UE is described. The method may include determining, during a multi-slot downlink transmission, that a mapping from a TCI state index to a first TCI state configuration has changed to a second TCI state configuration, selecting, based on the determined change, the first TCI state configuration or the second TCI state configuration to use for at least a portion of the multi-slot downlink transmission, and receiving the multi-slot downlink transmission during one or more slots according to the selected TCI state configuration and the TCI state index.

An apparatus for wireless communication at a UE is described. The apparatus may include a processor, memory in electronic communication with the processor, and instructions stored in the memory. The instructions may be executable by the processor to cause the apparatus to determine, during a multi-slot downlink transmission, that a mapping from a TCI state index to a first TCI state configuration has changed to a second TCI state configuration, select, based on the determined change, the first TCI state configuration or the second TCI state configuration to use for at least a portion of the multi-slot downlink transmission, and receive the multi-slot downlink transmission during one or more slots according to the selected TCI state configuration and the TCI state index.

Another apparatus for wireless communication at a UE is described. The apparatus may include means for determining, during a multi-slot downlink transmission, that a mapping from a TCI state index to a first TCI state configuration has changed to a second TCI state configuration, selecting, based on the determined change, the first TCI state configuration or the second TCI state configuration to use for at least a portion of the multi-slot downlink transmission, and receiving the multi-slot downlink transmission during one or more slots according to the selected TCI state configuration and the TCI state index.

A non-transitory computer-readable medium storing code for wireless communication at a UE is described. The code may include instructions executable by a processor to determine, during a multi-slot downlink transmission, that a mapping from a TCI state index to a first TCI state configuration has changed to a second TCI state configuration, select, based on the determined change, the first TCI state configuration or the second TCI state configuration to use for at least a portion of the multi-slot downlink transmission, and receive the multi-slot downlink transmission during one or more slots according to the selected TCI state configuration and the TCI state index.

In some examples of the method, apparatuses, and non-transitory computer-readable medium described herein, the TCI state index comprises a downlink control information (DCI) level TCI state index indicated by a DCI scheduling the multi-slot downlink transmission.

In some examples of the method, apparatuses, and non-transitory computer-readable medium described herein, the change in mapping is determined based at least in part on an indication received in a medium access control (MAC) control element (CE).

In some examples of the method, apparatuses, and non-transitory computer-readable medium described herein, the first TCI state configuration and the second TCI state configuration are configured by radio resource control (RRC) signaling and have corresponding RRC level TCI state indices.

Some examples of the method, apparatuses, and non-transitory computer-readable medium described herein may further include operations, features, means, or instructions for selecting the first TCI state configuration to use during each slot of the multi-slot downlink transmission.

In some examples of the method, apparatuses, and non-transitory computer-readable medium described herein, the first TCI state configuration may be determined based on a first slot occurring after decoding a signal scheduling the multi-slot downlink transmission.

In some examples of the method, apparatuses, and non-transitory computer-readable medium described herein, the first TCI state configuration may be determined based on a slot containing a signal scheduling the multi-slot downlink transmission.

Some examples of the method, apparatuses, and non-transitory computer-readable medium described herein may further include operations, features, means, or instructions for selecting the first TCI state configuration to use during a first subset of slots of the multi-slot downlink transmission and selecting the second TCI state configuration to use during a second subset of slots of the multi-slot downlink transmission, the first subset of slots occurring before the determined change and the second subset of slots occurring after the determined change.

Some examples of the method, apparatuses, and non-transitory computer-readable medium described herein may further include operations, features, means, or instructions for determining that the determined change occurs during the multi-slot downlink transmission and refraining, based on the determined change occurring during the multi-slot downlink transmission, from implementing the determined change.

Some examples of the method, apparatuses, and non-transitory computer-readable medium described herein may further include operations, features, means, or instructions for receiving a signal reconfiguring a set of candidate TCI state indices from a first set of TCI state configurations to a second set of TCI state configurations, where the determined change may be based on the signal.

In some examples of the method, apparatuses, and non-transitory computer-readable medium described herein, the signal includes at least one of a MAC CE, a RRC signal, a DCI field, or a combination thereof.

In some examples of the method, apparatuses, and non-transitory computer-readable medium described herein, the multi-slot downlink transmission includes at least one of a data transmission, a control transmission, a reference signal transmission, or a combination thereof.

A method of wireless communication at a UE is described. The method may include determining, during an uplink transmission, that a mapping from a resource index to a first spatial relation has changed to being mapped to a second spatial relation, selecting, based on the determined change, the first spatial relation or the second spatial relation to use for the uplink transmission, and transmitting the uplink transmission according to the selected spatial relation and the resource index.

An apparatus for wireless communication at a UE is described. The apparatus may include a processor, memory in electronic communication with the processor, and instructions stored in the memory. The instructions may be executable by the processor to cause the apparatus to determine, during an uplink transmission, that a mapping from a resource index to a first spatial relation has changed to being mapped to a second spatial relation, select, based on the determined change, the first spatial relation or the second spatial relation to use for the uplink transmission, and transmit the uplink transmission according to the selected spatial relation and the resource index.

Another apparatus for wireless communication at a UE is described. The apparatus may include means for determining, during an uplink transmission, that a mapping from a resource index to a first spatial relation has changed to being mapped to a second spatial relation, selecting, based on the determined change, the first spatial relation or the second spatial relation to use for the uplink transmission, and transmitting the uplink transmission according to the selected spatial relation and the resource index.

A non-transitory computer-readable medium storing code for wireless communication at a UE is described. The code may include instructions executable by a processor to determine, during an uplink transmission, that a mapping from a resource index to a first spatial relation has changed to being mapped to a second spatial relation, select, based on the determined change, the first spatial relation or the second spatial relation to use for the uplink transmission, and transmit the uplink transmission according to the selected spatial relation and the resource index.

In some examples of the method, apparatuses, and non-transitory computer-readable medium described herein, the uplink transmission may include operations, features, means, or instructions for selecting the second spatial relation for the uplink transmission.

Some examples of the method, apparatuses, and non-transitory computer-readable medium described herein may further include operations, features, means, or instructions for selecting the first spatial relation to use during each slot of the uplink transmission.

In some examples of the method, apparatuses, and non-transitory computer-readable medium described herein, the first spatial relation may be determined based on a first slot of the uplink transmission.

In some examples of the method, apparatuses, and non-transitory computer-readable medium described herein, the first spatial relation may be determined based on a slot containing a signal scheduling the uplink transmission.

Some examples of the method, apparatuses, and non-transitory computer-readable medium described herein may further include operations, features, means, or instructions for selecting the first spatial relation to use during a first subset of slots of the uplink transmission and selecting the second spatial relation to use during a second subset of slots of the uplink transmission, the first subset of slots occurring before the determined change and the second subset of slots occurring after the determined change.

Some examples of the method, apparatuses, and non-transitory computer-readable medium described herein may further include operations, features, means, or instructions for determining that the determined change occurs during the uplink transmission and refraining, based on the determined change occurring during the uplink transmission, from implementing the determined change.

Some examples of the method, apparatuses, and non-transitory computer-readable medium described herein may further include operations, features, means, or instructions for receiving a signal reconfiguring a set of candidate resource indices from a first set of spatial relations to a second set of spatial relations, where the determined change may be based on the signal.

In some examples of the method, apparatuses, and non-transitory computer-readable medium described herein, the signal includes at least one of a MAC CE, a RRC signal, a DCI field, or a combination thereof.

In some examples of the method, apparatuses, and non-transitory computer-readable medium described herein, the resource index includes at least one of a sounding reference signal (SRS) index, a physical uplink control channel (PUCCH) resource, or a combination thereof.

In some examples of the method, apparatuses, and non-transitory computer-readable medium described herein, the uplink transmission includes at least one of a data transmission, a control transmission, a reference signal transmission, or a combination thereof.

DETAILED DESCRIPTION

Figure 1:
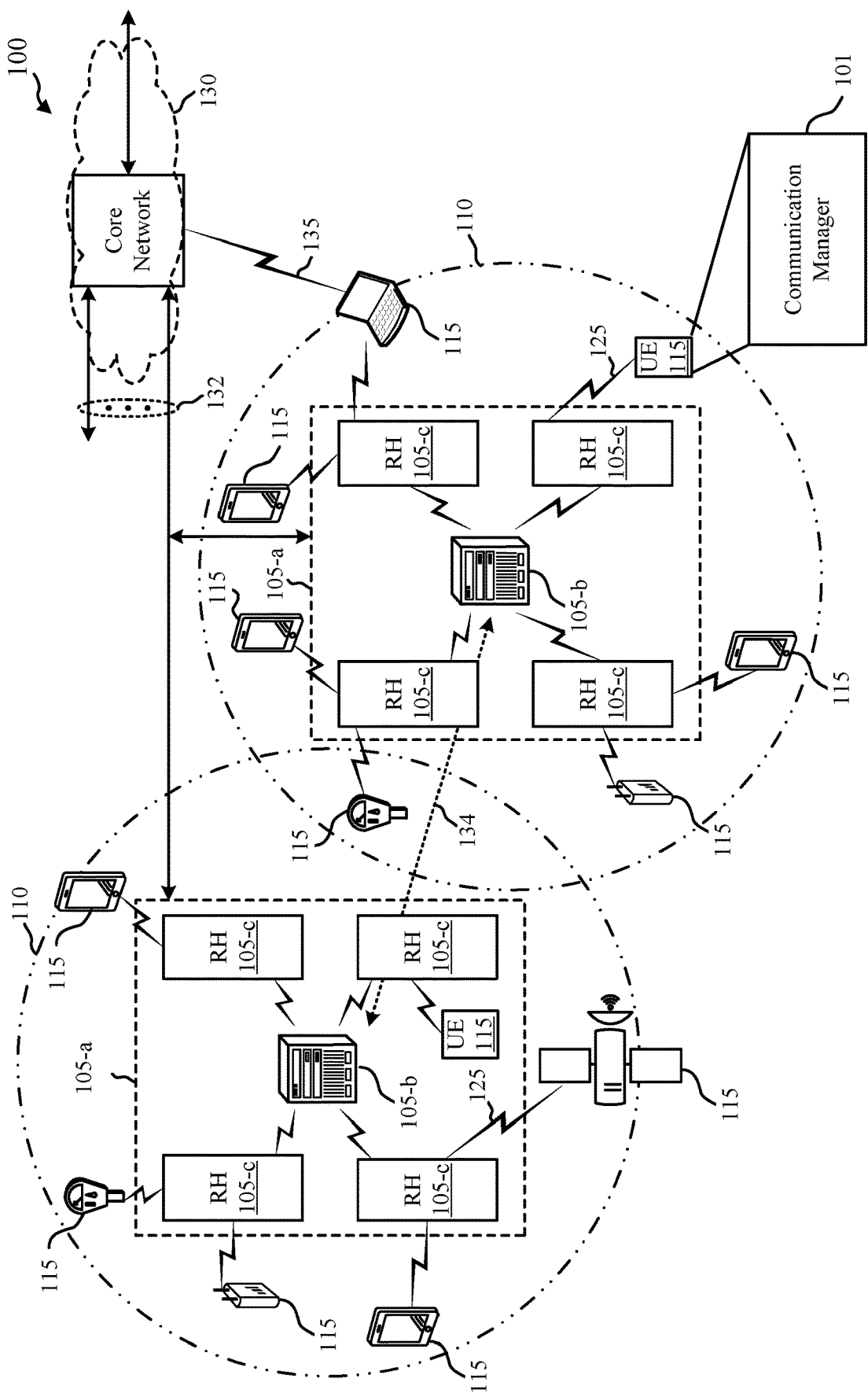
FIG. 1 illustrates an example of a system for wireless communications that supports candidate TCI states for slot aggregation, in accordance with one or more aspects of the present disclosure.

Aspects of the disclosure are initially described in the context of a wireless communications system. Broadly, aspects of the described techniques provide a mechanism that can be used by a UE to improve communications when one or more configuration parameters are changed during ongoing wireless communications. For example, for downlink communications, the described techniques may support a reconfiguration of the configuration information (e.g., TCI states) during a multi-slot downlink transmission. For example, the UE may determine that the mapping from a TCI index to a first TCI state configuration has been changed or otherwise updated to correspond to a second TCI state configuration. Accordingly, the UE may select either the first TCI state configuration (e.g., the old TCI state configuration) or the second TCI state configuration (e.g., the new or updated TCI state configuration) to use for at least a portion of the multi-slot downlink transmission. For example, the UE may use the first TCI state configuration for all of the slots in the multi-slot downlink transmission, or may use the first TCI state configuration for some of the slot(s) (e.g., for the slot(s) occurring before the TCI state indices are pre-configured) and then use the second TCI state configuration for the remaining slot(s) in the multi-slot downlink transmission. Accordingly, the UE may receive the multi-slot downlink transmission according to the selected TCI state configuration and the TCI state index.

In some cases, one or more TCI states may be activated on inactivated TCI states, and when a UE is configured with a multi-slot downlink transmission (e.g., a multi-slot physical downlink shared channel (PDSCH)), the UE may expect that the activated TCI states are the same across the slots of a scheduled multi-slot downlink transmission. In some cases, an indicated TCI state may be based on the activated TCI states in an initial slot of the scheduled multi-slot downlink transmission.

Additionally or alternatively, in some cases a UE may be configured with an aggregation factor (e.g., a pdsch-AggregationFactor) that indicates a downlink transmission is aggregated across two or more consecutive slots in a multi-slot downlink transmission, and the UE may apply a same set of quasi-co-location (QCL) parameters across the two or more consecutive slots. In some cases, the set of QCL parameters may include any combination of QCL-TypeA (e.g., Doppler shift, Doppler spread, average delay, delay spread), QCL-TypeB (e.g., Doppler shift, Doppler spread), QCL-TypeC (e.g., average delay, Doppler shift), or QCL-TypeD (e.g., spatial receive parameters), or any combinations thereof, which are applied to each PDSCH slot in a multi-slot transmission. In some cases, on top of the same set of QCL parameters, additional QCL parameter(s) may be optionally applied to each PDSCH slot and can be different across PDSCH slots.

In some cases, a reference signal resource (e.g., a non-zero-power (NZP) channel state information reference signal (CSI-RS) resources) may be used as a source of the spatial receive parameters. In such cases, the UE may transmit an indication to a serving base station that indicates whether the UE supports use of such a reference signal resource as the source of the spatial receive parameters (e.g., an indication that the UE supports an aperiodic NZP CSI-RS as source of QCL for downlink beam indication).

Additionally or alternatively, an example for an uplink indication may include the UE determining that the mapping for a resource index (e.g., a SRS index, PUCCH index, and the like) to a first spatial relation is changed such that it is now mapped to a second spatial relation. Based on the change to the resource index, the UE may select the first spatial relation or the second spatial relation to use for the uplink transmissions. Again, the UE may use the first spatial relation for some of the slot(s) of the uplink transmission and use the second spatial relation for the remaining slot(s) of the uplink transmission. Alternatively, the UE may use the first spatial relation for all of the slots of the uplink transmission.

In some cases, one or more spatial relations may be activated on inactivated spatial relations, and when a UE is configured with a multi-slot uplink transmission (e.g., a multi-slot physical uplink shared channel (PUSCH) or multi-slot PUCCH), the UE may expect the activated spatial relations are the same across the slots of a scheduled multi-slot uplink transmission. In some cases, an indicated spatial relations may be based on the activated spatial relations in an initial slot of the scheduled multi-slot uplink transmission.

Additionally or alternatively, in some cases a UE may be configured with an aggregation factor that indicates an uplink transmission is aggregated across two or more consecutive slots in a multi-slot uplink transmission, and the UE may apply a same set of spatial transmission parameters across the two or more consecutive slots. In some cases, a reference signal resource (e.g., a non-zero-power (NZP) channel state information reference signal (CSI-RS) resource) may be used as a source of the spatial transmission parameters. In such cases, the UE may transmit an indication to a serving base station that indicates whether the UE supports use of such a reference signal resource as the source of the spatial transmission parameters (e.g., an indication that the UE supports an aperiodic NZP CSI-RS as source of spatial relation for an uplink beam indication).

Aspects of the disclosure are further illustrated by and described with reference to apparatus diagrams, system diagrams, and flowcharts that relate to candidate TCI states for slot aggregation.

FIG. 1 illustrates an example of a wireless communications system 100 that supports elevation restriction beamforming in wireless systems, in accordance with one or more aspects of the present disclosure. The wireless communications system 100 includes network devices 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, IP connectivity, and other access, routing, or mobility functions. At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or another interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (which may be known as a TRP; however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signalto-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

UEs 115 may include a communication manager 101, which may determine, during a multi-slot downlink transmission, that a mapping from a TCI state index to a first TCI state configuration has changed to a second TCI state configuration. The communication manager 101 may select, based at least in part on the determined change, the first TCI state configuration or the second TCI state configuration to use for at least a portion of the multi-slot downlink transmission. The communication manager 101 may receive the multi-slot downlink transmission during one or more slots according to the selected TCI state configuration and the TCI state index.

Additionally or alternatively, the communication manager 101 may determine, during an uplink transmission, that a mapping from a resource index to a first spatial relation has changed to being mapped to a second spatial relation. The communication manager 101 may select, based at least in part on the determined change, the first spatial relation or the second spatial relation to use for the uplink transmission. The communication manager 101 may transmit the uplink transmission according to the selected spatial relation and the SRS index.

Figure 2:
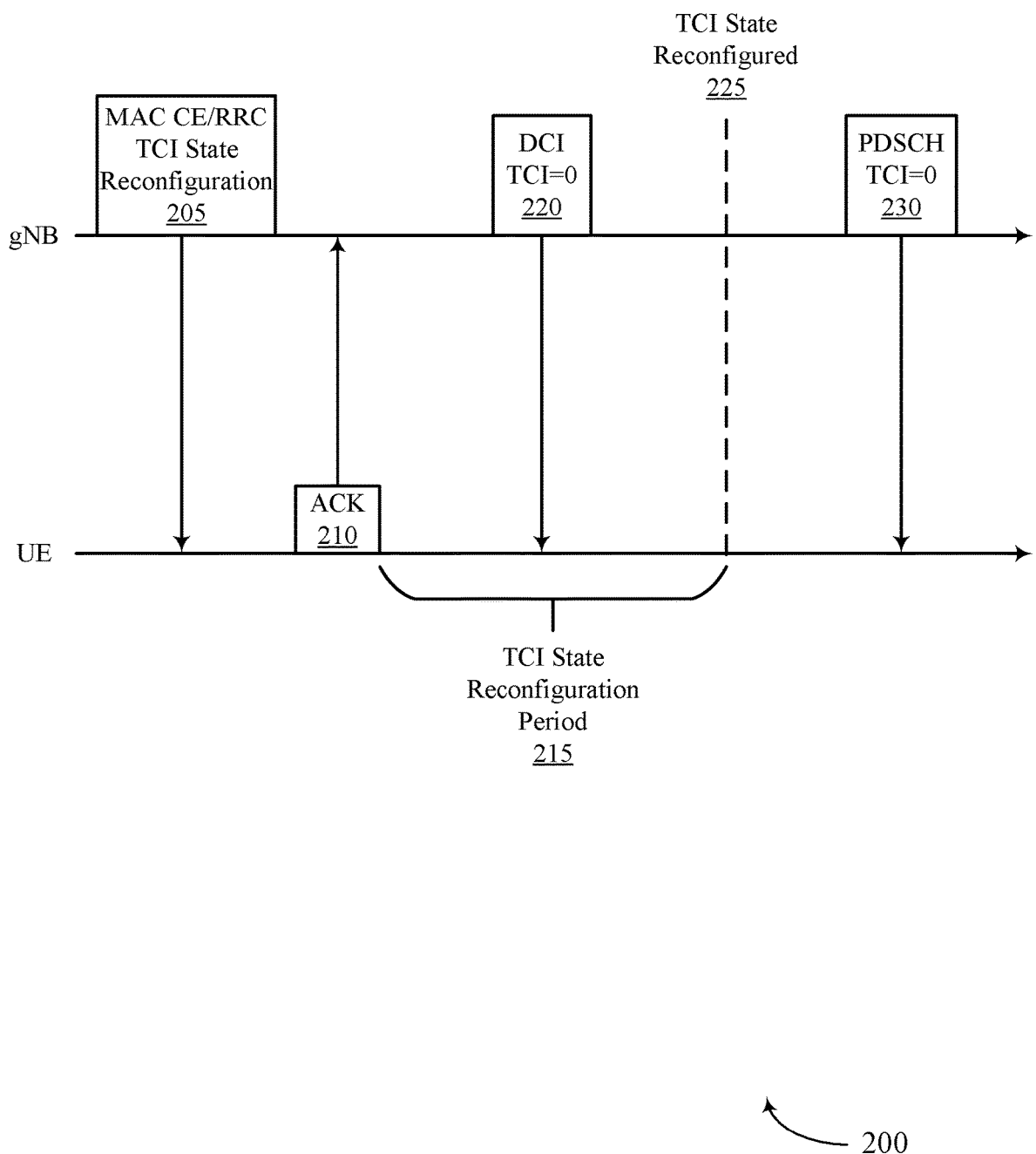
FIG. 2 illustrates an example of a slot configuration that supports candidate TCI states for slot aggregation, in accordance with one or more aspects of the present disclosure.

FIG. 2 illustrates an example of a slot configuration 200 that supports candidate TCI states for slot aggregation, in accordance with one or more aspects of the present disclosure. In some examples, slot configuration 200 may implement aspects of wireless communications system 100. Aspects of slot configuration 200 are described with respect to a base station (e.g., a gNB, a network device, and the like) and a UE, which may be examples of the corresponding devices described herein. Generally, slot configuration 200 illustrates a single slot downlink transmission implemented according to aspects of the described techniques.

Generally, various communication parameters are configured between the base station and UE to support downlink transmissions. One example of such parameters may include one or more TCI states configured by the base station for the downlink transmission. Generally, the TCI state may refer to a set of parameters that define spatial aspects for the downlink transmission, e.g., identifies the transmit beam, the receive beam, a beam identifier, a beam configuration, a beam direction, an angle of arrival, an angle of departure, and the like.

In one aspect, the base station may configure a set of candidate TCI indices for the UE. For example, the base station may configure 2, 4, 8, or some other number of TCI state indices for the UE, with each TCI state index having its own set of associated parameters (e.g., TCI state configuration). In some aspects, the first TCI state configuration and the second TCI state configuration are configured by RRC signaling and have corresponding RRC level TCI state indices. Accordingly, when the base station schedules a downlink transmission to the UE, it may provide an indication of which TCI state is to be used for the downlink transmission. As one example, a DCI scheduling the downlink transmission may include one or more bits (e.g., depending upon the number of candidate TCI state indices) or a field that is set to correspond to a particular TCI state index. For example, the one or more bits or field within the DCI scheduling the downlink transmission may be set to 011, which corresponds to TCI state index 3. As another example, the one or more bits or field within the DCI scheduling the downlink transmission may be set to 000, which corresponds to TCI state index 0. Typically, the UE would receive the DCI scheduling the downlink transmission, decode the one or more bits or fields within the DCI to determine which TCI state index is being signaled for the downlink transmission, and then receive the downlink transmission according to the TCI state configuration that corresponds to the TCI state index.

However, the base station may preconfigure the set of candidate TCI state indices. For example, due to UE mobility, interference, blocking, etc., the base station may reconfigure each TCI state configuration for the TCI state indices. More particularly, the TCI state indices may not change (e.g., the TCI state indices may remain 0-7, in the example where 8 candidate TCI state indices are configured). However, the TCI state configuration that corresponds to each TCI state index may be updated during a TCI state configuration reconfiguration procedure from the base station. As one example, TCI state index 0 (TCI=0) may correspond to a first TCI state configuration before the reconfiguration or change, but may correspond to a second TCI state configuration after that reconfiguration or change. One or more of the parameters associated with each TCI state configuration may be updated during the reconfiguration or change. Using this technique, the base station may still be able to set the one or more bits or fields within the DCI scheduling the downlink transmission to a value corresponding to a TCI state index, but after the reconfiguration or change the TCI state configuration that is associated with that TCI state index is different. In some aspects, the change in mapping is determined based at least in part on an indication received in a MAC CE, e.g., the change in mapping may be based on MAC CE signaling received from the base station.

This reconfiguration is illustrated in slot configuration 200 where the base station transmits (and the UE receives) a signal 205 that reconfigures the set of candidate TCI state indices from a first set of TCI state configurations to a second set of state TCI configurations. Generally, the signal 205 may include a higher layer signaling, such as an RRC signaling, a MAC CE, or other higher layer signaling. The signal 205 may also be carried in a DCI. The UE receives and decodes the signal 205 from the base station and responds with an acknowledgment (ACK) signal 210 to the base station that confirms that the signal was successfully decoded. However, processing delays within the UE may result in a TCI state reconfiguration period 215 which generally includes the time between when the ACK signal 210 is transmitted and when the TCI state reconfiguration 225 occurs. In one non-limiting example, the TCI state reconfiguration period 215 may be a multiple of the slot timing, e.g., 3 ms, to avoid occurring within a slot.

During the TCI state reconfiguration period 215, a downlink transmission may begin between the base station and the UE. For example, the base station may transmit a DCI 220 that schedules a downlink transmission from the base station to the UE. The DCI 220 may generally include one or more bits or fields (e.g., a code point field) that is set to a value that corresponds to a particular TCI state index. In the example slot configuration 200, the DCI 220 indicates that TCI state index 0 (TCI=0) is to be used for the downlink transmission.

However, as the DCI 220 is received before the TCI state reconfiguration 225, TCI state index 0 corresponds to a first TCI state configuration (e.g., as was previously configured by the base station). However, during the downlink transmission (e.g., between the time when DCI 220 schedules a downlink transmission and when PDSCH slot 230 carries the downlink data, control, and/or reference signals, the UE may determine that the mapping for the TCI state index 0 is changed from corresponding to the first TCI state configuration (e.g., the old TCI state configuration) to now correspond to the second TCI state configuration (e.g., the new TCI state configuration updated by TCI state configuration signal 205, which may include a MAC CE signal). In some aspects, the TCI state index may include a DCI level TCI state index indicated by DCI 220 scheduling the multi-slot downlink transmission.

Accordingly, aspects of the described techniques provide a mechanism where the UE chooses, identifies, or otherwise selects either the first TCI state configuration or the second TCI state configuration to use during the PDSCH slot 230 (e.g., to receive the downlink transmission). That is, the downlink transmission is generally still associated with TCI state index 0, but the corresponding TCI state configuration for TCI index 0 has been changed by the signal 205, with the reconfiguration completed during the downlink transmission (e.g., at the TCI state reconfiguration 225). Accordingly, the UE must now determine whether to utilize the old TCI state configuration or the changed or updated TCI state configuration to receive the PDSCH slot 230. In accordance with aspects of the described techniques, the UE may choose or select the second TCI state configuration to use to receive PDSCH slot 230. Accordingly, the UE may receive the downlink transmission (e.g., the PDSCH slot 230) according to the second TCI state configuration (e.g., as selected) and the TCI state index indicated (e.g., TCI=0) in the DCI 220.

Figure 3:
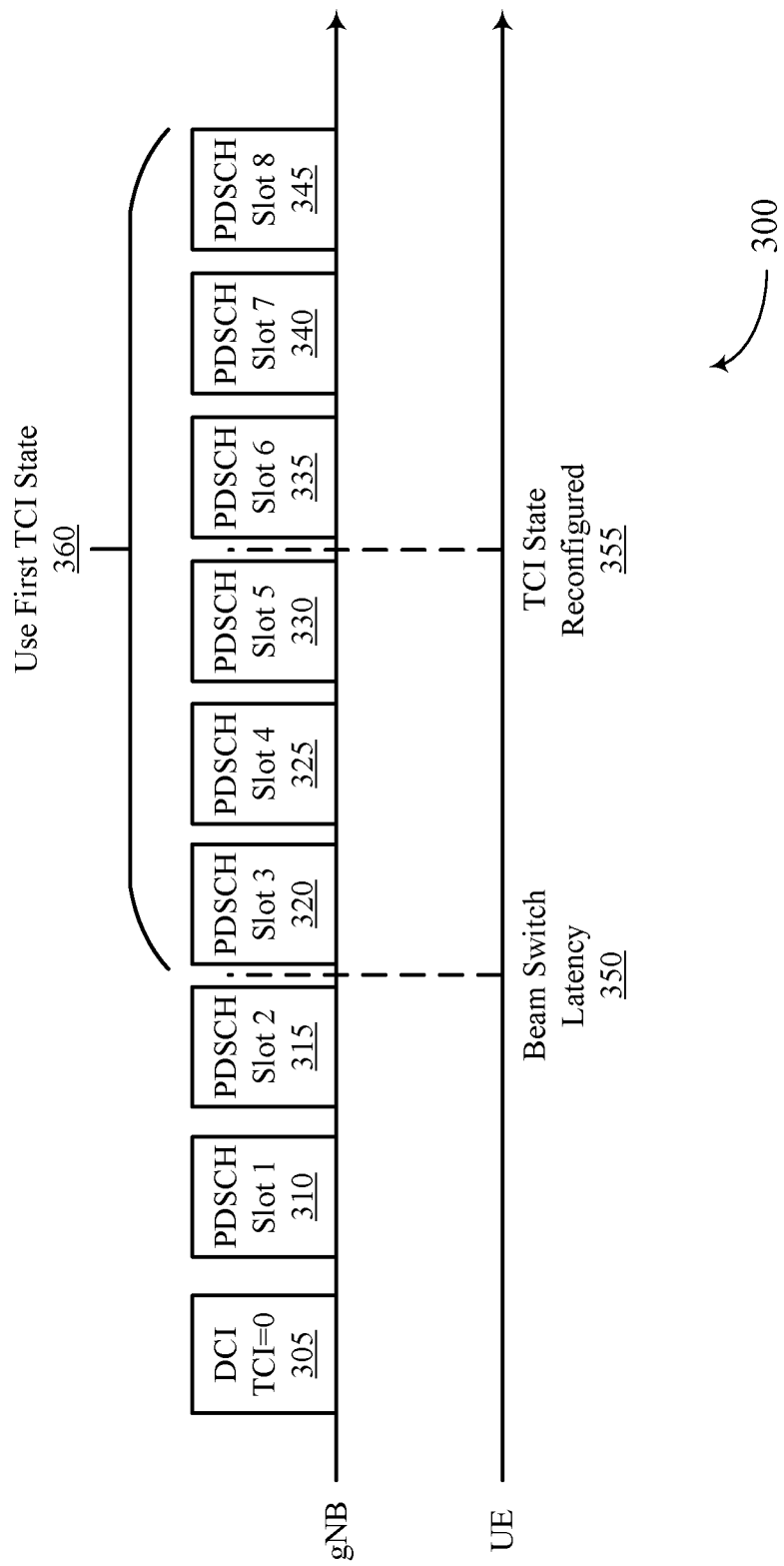
FIG. 3 illustrates an example of a slot configuration that supports candidate TCI states for slot aggregation, in accordance with one or more aspects of the present disclosure.

FIG. 3 illustrates an example of a slot configuration 300 that supports candidate TCI states for slot aggregation, in accordance with one or more aspects of the present disclosure. In some examples, slot configuration 300 may implement aspects of wireless communications system 100. Aspects of slot configuration 300 are described with respect to a base station (e.g., gNB, network device, and the like) and a UE, which may be examples of the corresponding devices described herein. Generally, slot configuration 300 illustrates a multi-slot downlink transmission scheme implemented according to aspects of the described techniques.

Generally, various communication parameters are configured between the base station and UE to support downlink transmissions. One example of such parameters may include one or more TCI states configured by the base station for the downlink transmission. Generally, the TCI state (or TCI state configuration) may refer to a set of parameters that define spatial aspects for the downlink transmission, e.g., identifies the transmit beam, a receive beam, a beam identifier, a beam configuration, a beam direction, an angle of arrival, an angle of departure, and the like. Other parameters for the downlink transmission may also be defined.

In one aspect, the base station may configure a set of candidate TCI indices for the UE. For example, the base station may configure 2, 4, 8, or some other number of candidate TCI state indices for the UE, with each TCI state index having its own set of associated parameters (e.g., a corresponding TCI state configuration). Accordingly, when the base station schedules a downlink transmission to the UE, it may provide an indication of which TCI state is to be used (e.g., an indication of a particular TCI state index) for the downlink transmission. As one example, the DCI scheduling the downlink transmission may include one or more bits (e.g., depending upon the number of candidate TCI state indices) or a field that is set to correspond to a particular TCI state index.

However, the base station may reconfigure the set of candidate TCI state indices, e.g., periodically, as-needed, etc. For example, due to UE mobility, interference, blocking, etc., the base station may reconfigure each TCI state configuration for the corresponding TCI state indices. More particularly, the TCI state indices may not change (e.g., the TCI state indices may remain 0-7, in the example where 8 candidate TCI state indices are configured). However, the TCI state configuration that corresponds to each TCI state index may be updated or changed during the reconfiguration from the base station. As one example, TCI state index zero (TCI=0) may correspond to a first TCI state configuration before the reconfiguration or change, but may correspond to a second TCI state configuration after the reconfiguration or change. Using this technique, the base station may still be able to set the one or more bits or fields within the DCI scheduling the downlink transmission to a value corresponding to a TCI state index, but after the reconfiguration or change the TCI state configuration that is associated with that TCI state index is different.

This reconfiguration may include the base station transmitting (and the UE receiving) a signal (not shown) that reconfigures the set of candidate TCI state indices from a first set of TCI state configurations to a second set of TCI state configurations. Generally, the signal may include a higher layer signaling, such as an RRC signaling, a MAC CE, or other higher layer signaling. In some aspects, the signal may include a DCI field. The UE receives and decodes the signal from the base station and responds with an ACK signal (not shown) to the base station that confirms that the signal was successfully decoded. However, processing delays within the UE may result in a TCI state reconfiguration period which generally includes the time between when the ACK signal is transmitted until when the TCI state reconfiguration 355 is completed. In one non-limiting example, the TCI state reconfiguration 355 may occur at a multiple of the slot timing, e.g., so as to occur between slots rather than during a slot.

During the TCI state reconfiguration period, a downlink transmission may begin between the base station and the UE. For example, the base station may transmit a DCI 305 that schedules a multi-slot downlink transmission from the base station to the UE. Slot aggregation may occur when the base station aggregates multiple slots for the downlink (and/or uplink) transmission. The multi-slot downlink transmission may span more than one slot, with eight slots being shown in slot configuration 300 by way of example only. Thus, the downlink transmission may span PDSCH slots 310, 315, 320, 325, 330, 335, 340, and/or 345. The DCI 305 may generally include one or more bits or fields (e.g., a code point field) that is set to a value that corresponds to a particular TCI state index. In the example slot configuration 300, the DCI 305 indicates that TCI state index 0 (TCI=0) is to be used for the multi-slot downlink transmission.

However, as the DCI 305 is received before the TCI state reconfiguration 355, TCI state index 0 corresponds to a first TCI state configuration (e.g., as was previously configured by the base station). However, during the downlink transmission (e.g., between the time when DCI 305 schedules the multi-slot downlink transmission and the PDSCH slots that carry the downlink data and/or reference signals), the UE may determine that the mapping for the TCI state index is changed from corresponding to the first TCI state configuration (e.g., the old TCI state configuration) to now correspond to the second TCI state configuration (e.g., the new TCI state configuration updated by TCI state configuration signal).

Accordingly, aspects of the described techniques provide a mechanism where the UE chooses, identifies, or otherwise selects either the first TCI state configuration or the second TCI state configuration to use during the downlink transmission (e.g., to receive the downlink transmission). That is, the downlink transmission is generally still associated with TCI state index 0, but the corresponding TCI state configuration for TCI index 0 has been changed by the TCI state reconfiguration signal, with the reconfiguration completed during the downlink transmission (e.g., at the TCI state reconfiguration 355). Accordingly, the UE must now determine whether to utilize the old TCI state configuration (e.g., the first TCI state configuration) or the changed or updated TCI state configuration (e.g., the second TCI state configuration) to receive some or all of the PDSCH slots 310-345. In accordance with aspects of the described techniques, the UE may select the first TCI state configuration during the slots 360 to use for the PDSCH slots carrying the downlink data, control, and/or reference signals. Accordingly, the UE may receive the downlink transmission (e.g., the PDSCH slots 310-345) according to the first TCI state configuration (e.g., as selected) and the TCI state index indicated in the DCI 305. Thus, the UE may select the first TCI configuration to use during each PDSCH slot of the multi-slot downlink transmission that occurs after decoding the DCI 305 scheduling the multi-slot downlink transmission.

However, there may also be a processing delay at the UE for decoding the DCI 305. In some aspects, PDSCH slot 310 and PDSCH slot 315 may use the first TCI state configuration or may use a legacy TCI state configuration due to the processing delay. For example, there may be a processing delay at the UE between when the DCI 305 is received and when the DCI 305 is successfully decoded. This processing delay is illustrated as a beam switch latency 350 in slot configuration 300. Thus, in some examples the UE may be using a legacy TCI state index prior to receiving the DCI 305, e.g., TCI state index 3 or 4 or some other TCI state index. As the UE has not successfully decoded the DCI 305 until the beam switch latency 350, the UE may continue using the legacy TCI state index (and corresponding TCI state configuration) for PDSCH slots 310 and 315. Once the UE has decoded the DCI 305 and determined that the TCI state index is set to TCI state index 0, the UE can then switch to the first TCI state configuration that corresponds to TCI state index 0 (e.g., before the reconfiguration or change). Between PDSCH slots 330 and 335, the UE may determine that the change has occurred where TCI index 0 is now mapped to the second TCI state configuration. However, in slot configuration 300 the UE may continue to use the first TCI state configuration to receive the slots 360 carrying the downlink data and/or reference signals. Thus, in this example each slot that occurs after decoding DCI 305 includes PDSCH slots 320-345.

Accordingly, the PDSCH in each slot that occurs after the beam switch latency 350 threshold uses the same candidate TCI state configuration, regardless of when the TCI state reconfiguration 355 happens between DCI 305 and the last slot (e.g., slot 8).

Figure 4:
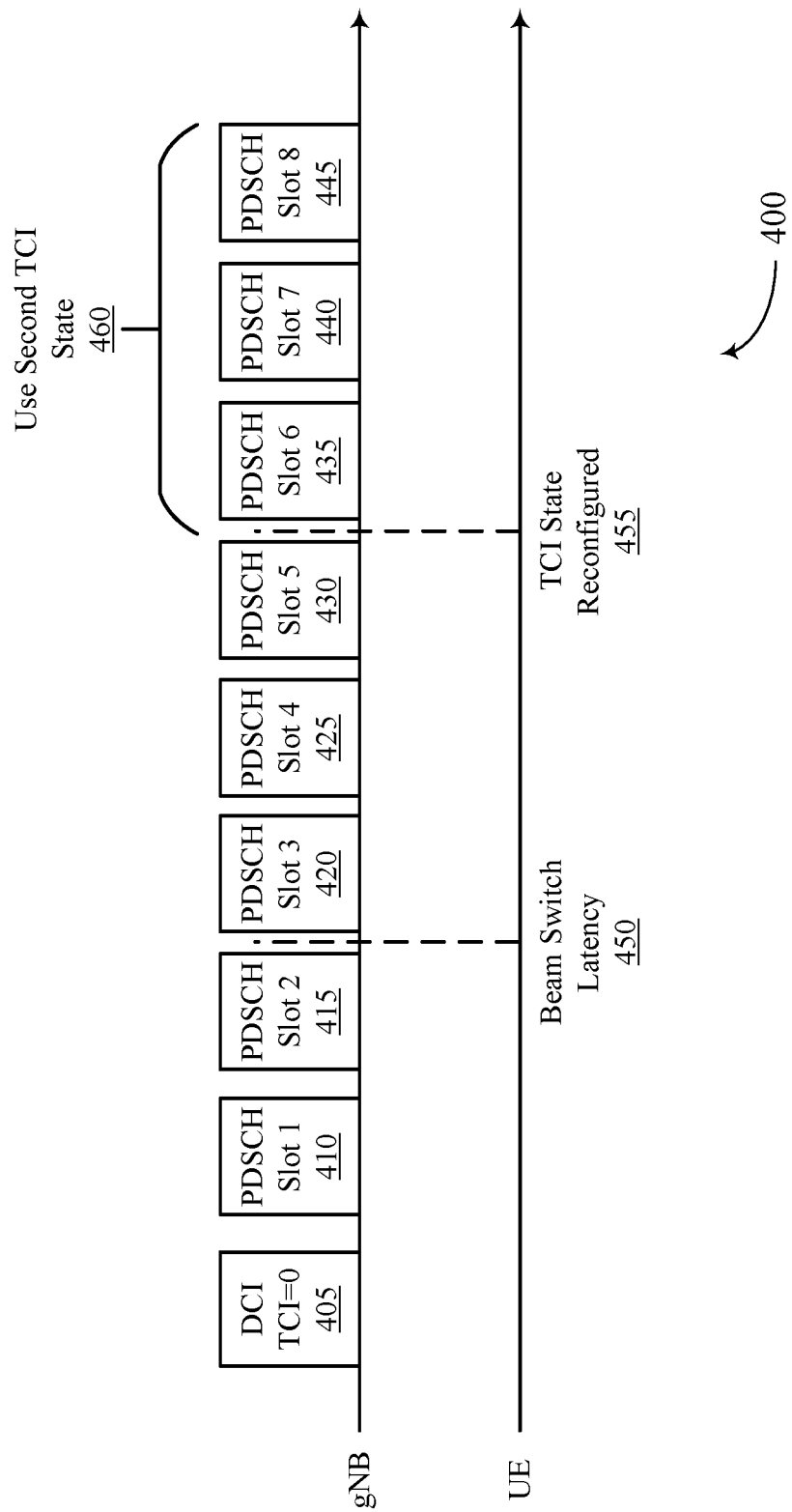
FIG. 4 illustrates an example of a slot configuration that supports candidate TCI states for slot aggregation, in accordance with one or more aspects of the present disclosure.

FIG. 4 illustrates an example of a slot configuration 400 that supports candidate TCI states for slot aggregation, in accordance with one or more aspects of the present disclosure. In some examples, slot configuration 400 may implement aspects of wireless communications system 100. Aspects of slot configuration 400 are described with respect to a base station (e.g., gNB, network device, etc.) and a UE, which may be examples of the corresponding devices described herein. Generally, slot configuration 400 illustrates a multi-slot downlink transmission scheme implemented according to aspects of the described techniques.

Generally, various communication parameters are configured between the base station and UE to support downlink transmissions. One example of such parameters may include one or more TCI states configured by the base station for the downlink transmission. Generally, the TCI state (or TCI state configuration) may refer to a set of parameters that define spatial aspects for the downlink transmission, e.g., identifies a transmit beam, a receive beam, a beam identifier, a beam configuration, a beam direction, an angle of arrival, an angle of departure, and the like. Other parameters for the downlink transmission may also be defined.

In one aspect, the base station may configure a set of candidate TCI state indices for the UE. For example, the base station may configure 2, 4, 8, or some other number of candidate TCI state indices for the UE, with each TCI state index having its own set of associated parameters (e.g., a corresponding TCI state configuration). Accordingly, when the base station schedules a downlink transmission to the UE, it may provide an indication of which TCI state is to be used (e.g., an indication of a TCI state index) for the downlink transmission. As one example, the DCI scheduling the downlink transmission may include one or more bits (e.g., depending upon the number of candidate TCI state indices) or a field that is set to correspond to a particular TCI state index.

However, the base station may reconfigure the set of candidate TCI state indices, e.g., periodically, as-needed, etc. For example, due to UE mobility, interference, blocking, etc., the base station may reconfigure each TCI state configuration for the corresponding TCI state indices. More particularly, the TCI state indices may not change (e.g., the TCI state indices may remain 0-7, in the example where eight candidate TCI state indices are configured). However, the TCI state configuration that corresponds to each TCI state index may be updated or changed during the reconfiguration from the base station. As one example, TCI state index 0 (TCI=0) may correspond to a first TCI state configuration before the reconfiguration or change, but may correspond to a second TCI state configuration after the reconfiguration or change. Using this technique, the base station may still be able to set the one or more bits or fields within the DCI scheduling the downlink transmission to a value corresponding to a TCI state index, but after the reconfiguration or change the TCI state configuration that is associated with that TCI state index is different.

This reconfiguration may include the base station transmitting (and the UE receiving) a signal (not shown) that reconfigures the set of candidate TCI state indices from a first set of TCI state configurations to a second set of TCI state configurations. Generally, the signal may include a higher layer signaling, such as an RRC signaling, a MAC CE, or other higher layer signaling. In some aspects, the signal may include a DCI field. The UE receives and decodes the signal from the base station and responds with an ACK signal (not shown) to the base station that confirms that the signal was successfully decoded. However, processing delays within the UE may result in a TCI state reconfiguration period which generally includes the time between when the ACK signal is transmitted until when the TCI state reconfiguration 455 is completed. In one non-limiting example, the TCI state reconfiguration 455 may occur at a multiple of the slot timing, e.g., so as to occur between slots rather than during a slot.

During the TCI state reconfiguration period, a downlink transmission may begin between the base station and the UE. For example, the base station may transmit a DCI 405 that schedules a multi-slot downlink transmission from the base station to the UE. The multi-slot downlink transmission may span more than one slots, with eight slots being shown in slot configuration 400 by way of example only. Thus, the downlink transmission may span PDSCH slots 410, 415, 420, 425, 430, 435, 440, and/or 445. The DCI 405 may generally include one or more bits or fields (e.g., a code point field) that is set to a value that corresponds to a particular TCI state index. In the example slot configuration 400, the DCI 405 indicates that TCI state index 0 (TCI=0) is to be used for the multi-slot downlink transmission.

However, as the DCI 405 is received before the TCI state reconfiguration 455, TCI state index 0 corresponds to a first TCI state configuration (e.g., as was previously configured by the base station). However, during the downlink transmission (e.g., between the time when DCI 405 schedules the multi-slot downlink transmission and the PDSCH slots that carry the downlink data control, and/or reference signals), the UE may determine that the mapping for the TCI state index is changed from corresponding to the first TCI state configuration (e.g., the old TCI state configuration) to now correspond to the second TCI state configuration (e.g., the new TCI state configuration updated by TCI state configuration signal).

Accordingly, aspects of the described techniques provide a mechanism where the UE chooses, identifies, or otherwise selects either the first TCI state configuration or the second TCI state configuration to use during the downlink transmission (e.g., to receive the downlink transmission). That is, the downlink transmission is generally still associated with TCI state index 0, but the corresponding TCI state configuration for TCI index 0 has been changed by the TCI state reconfiguration signal, with the reconfiguration completed during the downlink transmission (e.g., at the TCI state reconfiguration 455). Accordingly, the UE must now determine whether to utilize the old TCI state configuration (e.g., the first TCI state configuration) or the changed or updated TCI state configuration (e.g., the second TCI state configuration) to receive some or all of the PDSCH slots 410-445. In accordance with aspects of the described techniques, the UE may select the first TCI state configuration during the slots occurring before the determined change (e.g., a first subset of slots) and then select the second TCI state configuration during the slots occurring after the determined change (e.g., a second subset of slots). In this example, the first subset of slots can include PDSCH slots 410-430 and the second subset of slots can include PDSCH slots 435-445. Accordingly, the UE may receive the downlink transmission (e.g., the PDSCH slots 410-430) according to the first TCI state configuration and then receive the downlink transmission (e.g., PDSCH slots 435-455) according to the second TCI configuration, and the TCI state index indicated in the DCI 405.

However, there may also be a processing delay at the UE for decoding the DCI 405. In some aspects, PDSCH slot 410 and PDSCH slot 415 may use the first TCI state configuration or may use a legacy TCI state configuration due to the processing delay. For example, there may be a processing delay at the UE between when the DCI 405 is received and when the DCI 405 is successfully decoded. This processing delay is illustrated as a beam switch latency 450 in slot configuration 400. Thus, in some examples the UE may be using a legacy TCI state index prior to receiving the DCI 405, e.g., TCI state index 3 or 4 or some other TCI state index. As the UE has not successfully decoded the DCI 405 until the beam switch latency 450, the UE may continue using the legacy TCI state index (and corresponding TCI state configuration) for PDSCH slots 410 and 415. Once the UE has decoded the DCI 405 and determined that the TCI state index is set to TCI state index 0, the UE can then switch to the first TCI state configuration that corresponds to TCI state index 0 (e.g., before the reconfiguration or change). Between PDSCH slots 430 and 435, the UE may determine that the change has occurred where TCI index 0 is now mapped to the second TCI state configuration. Accordingly, in slot configuration 400 the UE may use the second TCI state configuration to receive the PDSCH slots 460 carrying the downlink data and/or reference signals after the change is determined.

In some aspects, PDSCH in each slot after both the beam switch latency 450 threshold and TCI state reconfiguration 455 time uses new candidate TCI states (e.g., the second TCI state configuration) in that slot, if the TCI state reconfiguration 455 time happens in the duration from DCI 405 to the last slot (e.g., slot 8). That is, the indicated TCI state for each slot with scheduled PDSCH may be based on the candidate TCI states in that slot. In some examples, aspects of slot configuration 400 may be utilized by UEs that are unable to store old candidate TCI states.

Figure 5:
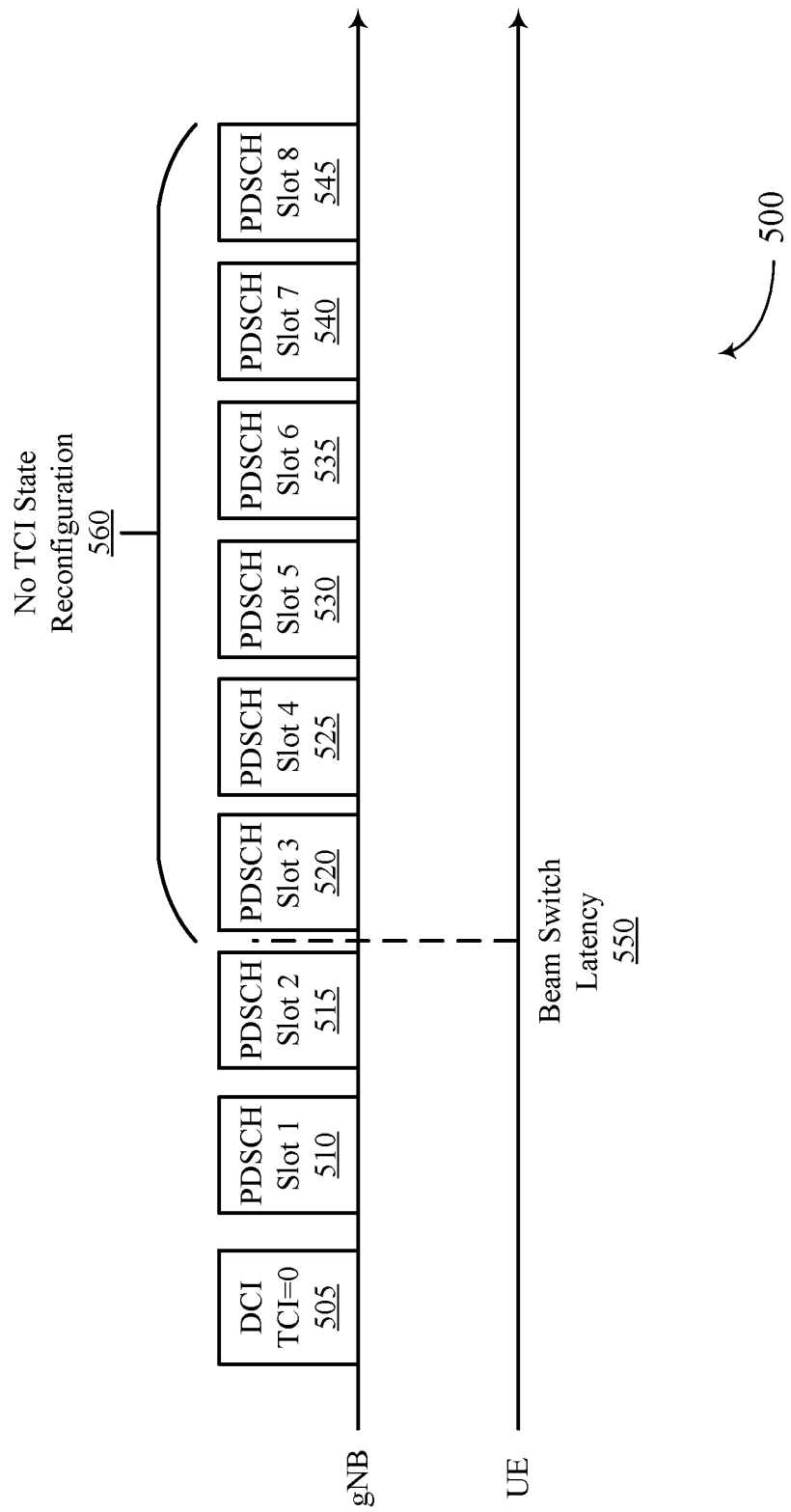
FIG. 5 illustrates an example of a slot configuration that supports candidate TCI states for slot aggregation, in accordance with one or more aspects of the present disclosure.

FIG. 5 illustrates an example of a slot configuration 500 that supports candidate TCI states for slot aggregation, in accordance with one or more aspects of the present disclosure. In some examples, slot configuration 500 may implement aspects of wireless communications system 100. Aspects of slot configuration 500 are described with respect to a base station (e.g., gNB, network device, and the like) and a UE, which may be examples of the corresponding devices described herein. Generally, slot configuration 500 illustrates a multi-slot downlink transmission scheme implemented according to aspects of the described techniques.

Generally, various communication parameters are configured between the base station and UE to support downlink transmissions. One example of such parameters may include one or more TCI states configured by the base station for the downlink transmission. Generally, the TCI state (or TCI state configuration) may refer to a set of parameters that define spatial aspects for the downlink transmission, e.g., identifies a transmit beam, a receive beam, a beam identifier, a beam configuration, a beam direction, an angle of arrival, an angle of departure, and the like. Other parameters for the downlink transmission may also be defined.

In one aspect, the base station may configure a set of candidate TCI indices for the UE. For example, the base station may configure 2, 4, 8, or some other number of candidate TCI state indices for the UE, with each TCI state index having its own set of associated parameters (e.g., a corresponding TCI state configuration). Accordingly, when the base station schedules a downlink transmission to the UE, it may provide an indication of which TCI state is to be used (e.g., an indication of a particular TCI state index) for the downlink transmission. As one example, the DCI scheduling the downlink transmission may include one or more bits (e.g., depending upon the number of candidate TCI state indices) or a field that is set to correspond to a particular TCI state index.

However, the base station may reconfigure the set of candidate TCI state indices, e.g., periodically, as-needed, etc. For example, due to UE mobility, interference, blocking, etc., the base station may reconfigure each TCI state configuration for the corresponding TCI state indices. More particularly, the TCI state indices may not change (e.g., the TCI state indices may remain 0-7, in the example where eight candidate TCI state indices are configured). However, the TCI state configuration that corresponds to each TCI state index may be updated or changed during the reconfiguration from the base station. As one example, TCI state index 0 (TCI=0) may correspond to a first TCI state configuration before the reconfiguration or change, but may correspond to a second TCI state configuration after the reconfiguration or change. Using this technique, the base station may still be able to set the one or more bits or fields within the DCI scheduling the downlink transmission to a value corresponding to a TCI state index, but after the reconfiguration or change the TCI state configuration that is associated with that TCI state index is different.

This reconfiguration may include the base station transmitting (and the UE receiving) a signal (not shown) that reconfigures the set of candidate TCI state indices from a first set of TCI state configurations to a second set of state TCI configurations. Generally, the signal may include a higher layer signaling, such as an RRC signaling, a MAC CE, or other higher layer signaling. In some aspects, the signal may include a DCI field. The UE receives and decodes the signal from the base station and responds with an ACK signal (not shown) to the base station that confirms that the signal was successfully decoded. However, processing delays within the UE may result in a TCI state reconfiguration period which generally illustrates the time between when the ACK signal is transmitted until when the TCI state index reconfiguration is completed. In one non-limiting example, the TCI state reconfiguration may occur at a multiple of the slot timing, e.g., so as to occur between slots rather than during a slot.

During the TCI state reconfiguration period, a downlink transmission may begin between the base station and the UE. For example, the base station may transmit a DCI 505 that schedules a multi-slot downlink transmission from the base station to the UE. The multi-slot downlink transmission may span more than one slots, with eight slots being shown in slot configuration 500 by way of example only. Thus, the downlink transmission may span PDSCH slots 510, 515, 520, 525, 530, 535, 540, and/or 545. The DCI 505 may generally include one or more bits or fields (e.g., a code point field) that is set to a value that corresponds to a particular TCI state index. In the example slot configuration 500, the DCI 505 indicates that TCI state index 0 (TCI=0) is to be used for the multi-slot downlink transmission.

However, as the DCI 505 is received before the TCI state reconfiguration, TCI state index 0 corresponds to a first TCI state configuration (e.g., as was previously configured by the base station). However, during the downlink transmission (e.g., between the time when DCI 505 schedules the multi-slot downlink transmission and the PDSCH slots that carry the downlink data, control, and/or reference signals), the UE may determine that the mapping for the TCI state index is changed from corresponding to the first TCI state configuration (e.g., the old TCI state configuration) to now correspond to the second TCI state configuration (e.g., the new TCI state configuration updated by TCI state configuration signal).

Accordingly, aspects of the described techniques provide a mechanism where the UE chooses, identifies, or otherwise selects either the first TCI state configuration or the second TCI state configuration to use during the downlink transmission (e.g., to receive the downlink transmission). That is, the downlink transmission is generally still associated with TCI state index 0, but the corresponding TCI state configuration for TCI index 0 has been changed by the TCI state reconfiguration signal, with the reconfiguration completed during the downlink transmission (e.g., at the TCI state reconfiguration). Accordingly, the UE must now determine whether to utilize the old TCI state configuration (e.g., the first TCI state configuration) or the changed or updated TCI state configuration (e.g., the second TCI state configuration) to receive some or all of the PDSCH slots 510-545. In accordance with aspects of the described techniques, the UE may avoid the TCI state reconfiguration and, instead, select the first TCI state configuration during the multi-slot downlink transmission. That is, the UE may refrain from updating the candidate set of TCI state indices during the downlink transmission and, instead, continue the downlink transmission using the first TCI state configuration. After the downlink transmission ends, the UE may then update the candidate set of TCI state indices according to the TCI reconfiguration signal. Accordingly, the UE may receive the downlink transmission (e.g., the PDSCH slots 510-545) according to the first TCI state configuration (e.g., as selected) and the TCI state index indicated in the DCI 505.

However, there may also be a processing delay at the UE for decoding the DCI 505. In some aspects, PDSCH slot 510 and PDSCH slot 515 may use the first TCI state configuration or may use a legacy TCI state configuration due to the processing delay. For example, there may be a processing delay at the UE between when the DCI 505 is received and when the DCI 505 is successfully decoded. This processing delay is illustrated as a beam switch latency 550 in slot configuration 500. Thus, in some examples the UE may be using a legacy TCI state index prior to receiving the DCI 505, e.g., TCI state index 3 or 4 or some other TCI state index. As the UE has not successfully decoded the DCI 505 until the beam switch latency 550, the UE may continue using the legacy TCI state index (and corresponding TCI state configuration) for PDSCH slots 510 and 515. Once the UE has decoded the DCI 505 and determined that the TCI state index is set to TCI state index 0, the UE can then switch to the first TCI state configuration that corresponds to TCI state index 0 (e.g., before the reconfiguration or change). Between PDSCH slots 530 and 535, the UE may determine that the change has occurred where TCI index 0 is now mapped to the second TCI state configuration. However, in slot configuration 500 the UE may refrain from using the second TCI state configuration and, instead, continue to use the first TCI state configuration to receive the PDSCH slots 560 carrying the downlink data and/or reference signals after the change is determined.

Figure 6:
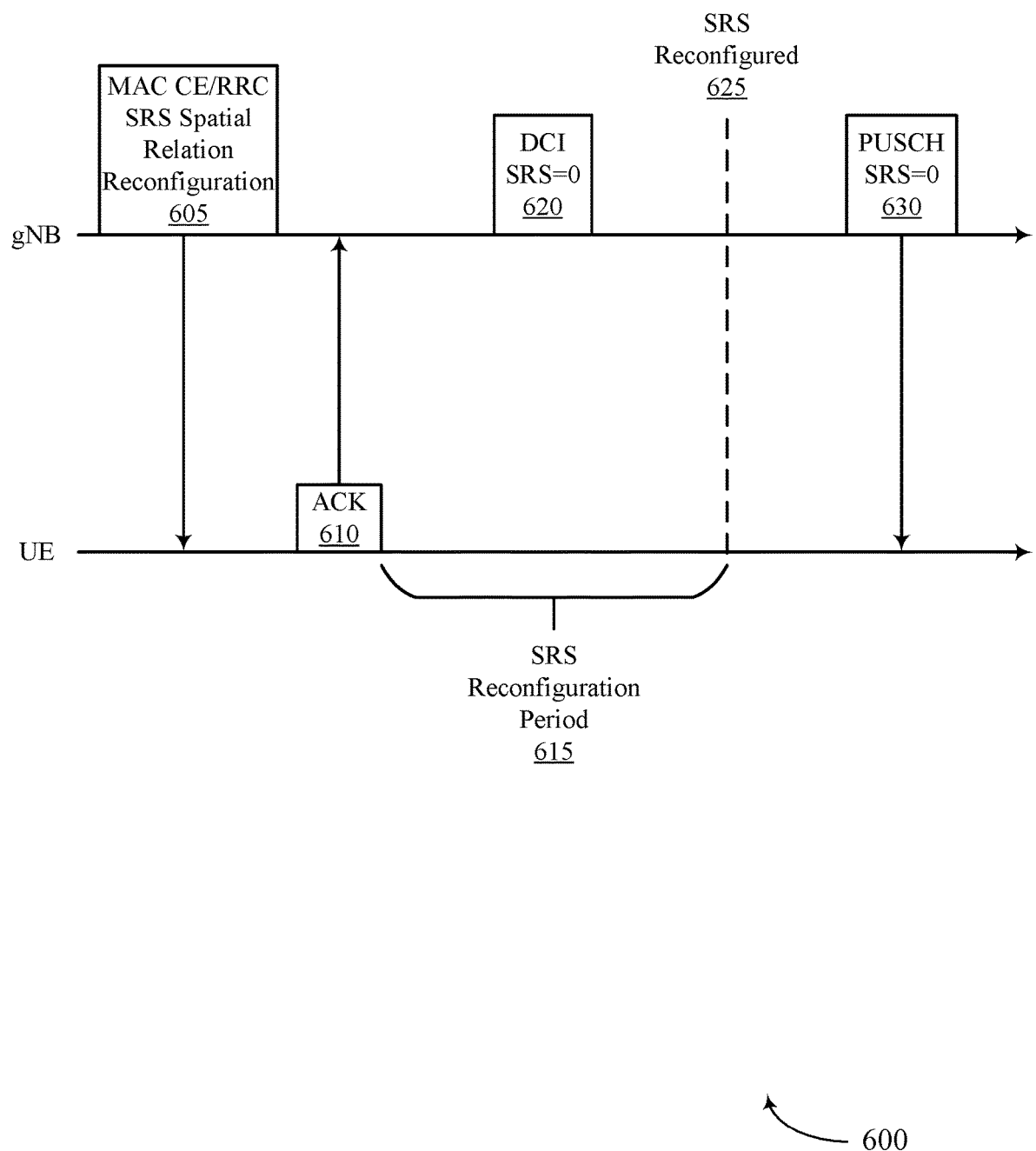
FIG. 6 illustrates an example of a slot configuration that supports candidate TCI states for slot aggregation, in accordance with one or more aspects of the present disclosure.

FIG. 6 illustrates an example of a slot configuration 600 that supports candidate TCI states for slot aggregation, in accordance with one or more aspects of the present disclosure. In some examples, slot configuration 600 may implement aspects of wireless communications system 100. Aspects of slot configuration 600 are described with respect to a base station (e.g., gNB, network device, and the like) and a UE, which may be examples of the corresponding devices described herein. Generally, slot configuration 600 illustrates a single slot uplink transmission implemented according to aspects of the described techniques.

Generally, the various communication parameters configured between the base station and UE to support uplink transmissions. One example of such parameters may include one or more SRS configurations configured by the base station for the uplink transmission. Generally, the SRS configuration may refer to a set of parameters that define spatial aspects for the uplink transmission, e.g., identifies the transmit beam, the receive beam, the beam identifier, beam configuration, a beam direction, an angle of arrival, an angle of departure, and the like.

In one aspect, the base station may configure a set of candidate resource indices (e.g., SRS indices, PUSCH indices, and the like) for the UE. For example, the base station may configure 2, 4, 8, or some other number of resource indices for the UE, with each resource index having its own set of associated parameters. Accordingly, the base station schedules an uplink transmission to the UE, it may provide an indication of which resource index is to be used for the uplink transmission. As one example, the DCI scheduling the uplink transmission may include one or more bits (e.g., depending upon the number of candidate resource indices) that are set to correspond to a particular resource index. For example, the one or more bits or field within the DCI scheduling an uplink transmission may be set to 011, which corresponds to resource index 3. As another example, the one or more bits or field within the DCI scheduling an uplink transmission may be set to 000, which corresponds to resource index 0. Accordingly, the UE would receive the DCI scheduling the uplink transmission, decode the one or more bits or fields within the DCI to determine which resource index is being signaled for the uplink transmission, and then transmit the uplink transmission according to the spatial relation that corresponds to the resource index.

However, the base station may preconfigure the set of candidate resource indices. For example, due to UE mobility, interference, blocking, etc., the base station may reconfigure each spatial relation for the resource indices. More particularly, the resource indices may not change (e.g., the resource indices may remain 0-7, in the example where 8 candidate resource indices are configured). However, the spatial relation that corresponds to each resource index may be updated during a reconfiguration from the base station. As one example, resource index 0 (SRS=0) may correspond to a first spatial relation before the reconfiguration or change, but may correspond to a second spatial relation after the reconfiguration or change. Using this technique, the base station may still be able to set the one or more bits or fields within the DCI scheduling the uplink transmission to a value corresponding to a particular resource index, but after the reconfiguration or change the spatial relation that is associated with that resource index is different.

This reconfiguration is illustrated in slot configuration 600 where the base station transmits (and the UE receives) a signal 605 that reconfigures the set of candidate resource indices from a first set of spatial relations to a second set of spatial relations. Generally, the signal 605 may include a higher layer signaling, such as an RRC signaling, a MAC CE, or other higher layer signaling. In some aspects, the signal 605 may be a DCI field. The UE receives and decodes the signal 605 from the base station and responds with an ACK signal 610 to the base station that confirms that the signal 605 was successfully decoded. However, processing delays within the UE may result in an SRS reconfiguration period 615 which generally illustrates the time between when the ACK signal 610 is transmitted and when the SRS reconfiguration 625 is completed. In one nonlimiting example, the SRS reconfiguration 625 may occur during a multiple of the slot timing, e.g., 1 ms, to avoid occurring during a slot.

During the SRS reconfiguration period 615, an uplink transmission may begin between the base station and the UE. For example, the base station may transmit a DCI 620 that schedules the uplink transmission from the UE to the base station. The DCI 620 may generally include one or more bits or fields (e.g., a code point field) that is set to a value that corresponds to a particular resource index. In the example slot configuration 600, the DCI 620 indicates that resource index 0 (SRS=0) is to be used for the uplink transmission.

However, as the DCI 620 is received before the SRS reconfiguration 625, resource index 0 corresponds to a first spatial relation (e.g., as was previously configured by the base station). However, during the uplink transmission (e.g., between the time when DCI 620 schedules the uplink transmission and the PUSCH slot 630 carries the uplink data, control, and/or reference signal, the UE may determine that the mapping for the resource index is changed from corresponding to the first spatial relation (e.g., the old spatial relation) to now correspond to the second spatial relation (e.g., the new spatial relation updated by signal 605).

Accordingly, aspects of the described techniques provide a mechanism where the UE chooses, identifies, or otherwise selects either the first spatial relation or the second spatial relation to use during the PUSCH slot 630 (e.g., to transmit the uplink transmission). That is, the uplink transmission is generally still associated with resource index 0, but the corresponding spatial relation for SRS=0 has been changed by the signal 605, with the reconfiguration completed during the uplink transmission (e.g., at the SRS reconfiguration 625). Accordingly, the UE must now determine whether to utilize the old spatial relation or the changed or updated spatial relation to transmit the PUSCH slot 630. In accordance with aspects of the described techniques, the UE may choose or select the second spatial relation to use during the PUSCH slot 630. Accordingly, the UE may transmit the uplink transmission (e.g., the PUSCH slot 630) according to the second spatial relation (e.g., as selected) and the resource index indicated in the DCI 620.

In some aspects, the resource index is an SRS resource identifier (SRI) that may be based on the candidate SRS spatial relation configuration in the slot with the scheduled PUSCH (e.g., PUSCH slot 630). In another option, the SRS spatial relation of the indicated SRI may be based on the candidate SRS spatial relation configuration in the slot with the scheduling DCI (e.g., in the slot carrying DCI 620).

Figure 7:
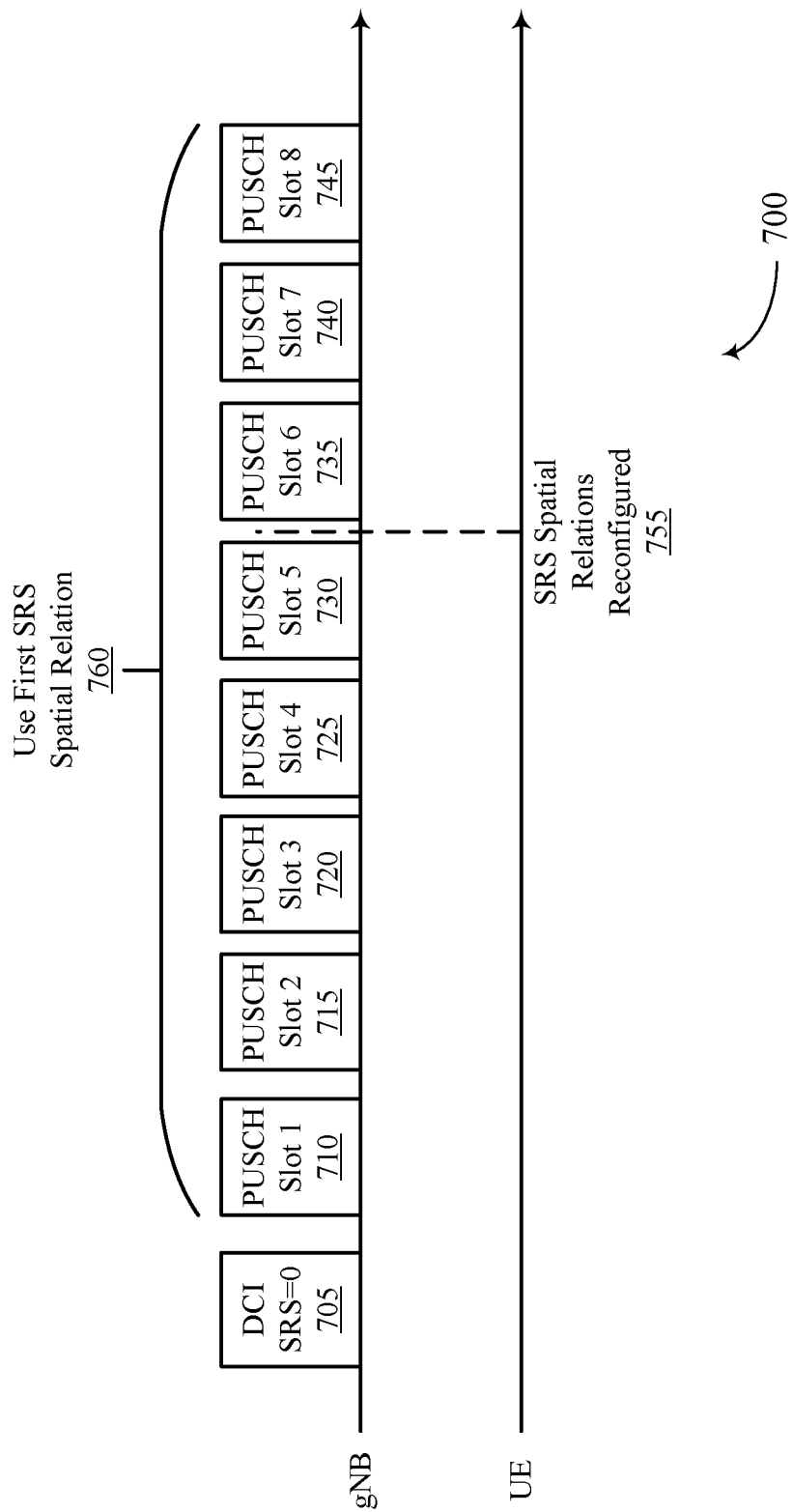
FIG. 7 illustrates an example of a slot configuration that supports candidate TCI states for slot aggregation, in accordance with one or more aspects of the present disclosure.

FIG. 7 illustrates an example of a slot configuration 700 that supports candidate TCI states for slot aggregation, in accordance with one or more aspects of the present disclosure. In some examples, slot configuration 700 may implement aspects of wireless communications system 100. Aspects of slot configuration 700 are described with respect to a base station (e.g., gNB, network device, etc.) and a UE, which may be examples of the corresponding devices described herein. Generally, slot configuration 700 illustrates a multi-slot uplink transmission scheme implemented according to aspects of the described techniques.

Generally, various communication parameters are configured between the base station and UE to support uplink transmissions. One example of such parameters may include one or more SRSs configured by the base station for the uplink transmission. Generally, the SRSs (or spatial relation) may refer to a set of parameters that define spatial aspects for the uplink transmission, e.g., identifies a transmit beam, a receive beam, a beam identifier, a beam configuration, a beam direction, an angle of arrival, an angle of departure, and the like. Other parameters for the uplink transmission may also be defined.

In one aspect, the base station may configure a set of candidate resource indices for the UE (e.g., SRS indices, PUCCH indices, etc.). For example, the base station may configure 2, 4, 8, or some other number of candidate resource indices for the UE, with each resource index having its own associated parameters (e.g., a corresponding spatial relation). Accordingly, when the base station schedules an uplink transmission to the UE, it may provide an indication of which SRS is to be used (e.g., which resource index) for the uplink transmission. As one example, the DCI scheduling the uplink transmission may include one or more bits (e.g., depending upon the number of candidate resource indices) or a field that is set to correspond to a particular resource index.

However, the base station may reconfigure the set of candidate resource indices, e.g., periodically, as-needed, etc. For example, due to UE mobility, interference, blocking, etc., the base station may reconfigure each spatial relation for the corresponding resource indices. More particularly, the resource indices may not change (e.g., the resource indices may remain 0-7, in the example where eight candidate resource indices are configured). However, the spatial relation that corresponds to each resource index may be updated or changed during the reconfiguration from the base station. As one example, resource index 0 (SRS=0) may correspond to a first spatial relation before the reconfiguration or change, but may correspond to a second spatial relation after the reconfiguration or change. Using this technique, the base station may still be able to set the one or more bits or fields within the DCI scheduling the uplink transmission to a value corresponding to a particular resource index, but after the reconfiguration or change the spatial relation that is associated with that resource index is different.

This reconfiguration may include the base station transmitting (and the UE receiving) a signal (not shown) that reconfigures the set of candidate resource indices from a first set of spatial relations to a second set of spatial relations. Generally, the signal may include a higher layer signaling, such as an RRC signaling, a MAC CE, or other higher layer signaling, or may use a DCI field. The UE receives and decodes the signal from the base station and responds with an ACK signal (not shown) to the base station that confirms that the signal was successfully decoded. However, processing delays within the UE may result in an SRS reconfiguration period which generally illustrates the time between when the ACK signal is transmitted until when the SRS spatial relation reconfiguration 755 is completed. In one non-limiting example, the SRS spatial relation reconfiguration 755 may occur at a multiple of the slot timing, e.g., so as to occur between slots rather than during a slot.

During the SRS reconfiguration period, an uplink transmission may begin between the base station and the UE. For example, the base station may transmit a DCI 705 that schedules a multi-slot uplink transmission from the UE to the base station. The multi-slot uplink transmission may span more than one slot, with eight slots being shown in slot configuration 700 by way of example only. Thus, the uplink transmission may span PUSCH slots 710, 715, 720, 725, 730, 735, 740, and/or 745. The DCI 705 may generally include one or more bits or fields (e.g., a code point field) that is set to a value that corresponds to a particular resource index. In the example slot configuration 700, the DCI 705 indicates that resource index 0 (SRS=0) is to be used for the multi-slot uplink transmission.

However, as the DCI 705 is received before the SRS spatial relation reconfiguration 755, resource index 0 corresponds to a first spatial relation (e.g., as was previously configured by the base station). However, during the uplink transmission (e.g., between the time when DCI 705 schedules the multi-slot uplink transmission and the PUSCH slots that carry the uplink data, control, and/or reference signal), the UE may determine that the mapping for the resource index is changed from corresponding to the first spatial relation (e.g., the old SRS spatial relation) to now correspond to the second spatial relation (e.g., the new SRS spatial relation updated by SRS spatial relation configuration signal).

Accordingly, aspects of the described techniques provide a mechanism where the UE chooses, identifies, or otherwise selects either the first spatial relation or the second spatial relation to use during the uplink transmission (e.g., to transmit the uplink transmission). That is, the uplink transmission is generally still associated with resource index 0 (SRS=0), but the corresponding spatial relation for resource index 0 has been changed by the SRS spatial relation reconfiguration signal, with the reconfiguration completed during the uplink transmission (e.g., at the SRS spatial relation reconfiguration 755). Accordingly, the UE must now determine whether to utilize the old spatial relation (e.g., the first spatial relation) or the changed or updated spatial relation (e.g., the second spatial relation) to transmit some or all of the PUSCH slots 710-745. In accordance with aspects of the described techniques, the UE may select the first spatial relation during the slots 760 to use for the PUSCH slots carrying the uplink data, control, and/or reference signals. Accordingly, the UE may transmit the uplink transmission (e.g., the PUSCH slots 710-745) according to the first spatial relation (e.g., as selected) and the resource index indicated in the DCI 705. Thus, the UE may select the first spatial relation to use during each PUSCH slot of the multi-slot uplink transmission that occurs after decoding the DCI 705 scheduling the multi-slot uplink transmission.

In some aspects, PUSCH in each slot may use the same common candidate SRS spatial relations, regardless of when the reconfiguration time happens in the duration from DCI 705 to the last slot (e.g., to PUSCH slot 630), or not. In some aspects, the common candidate SRS spatial relations can be those determined in the first PUSCH slot (e.g., PUSCH slot 710). In some aspects, the common candidate SRS spatial relations can be those determined in the scheduling slot (e.g., in the slot carrying DCI 705).

Figure 8:
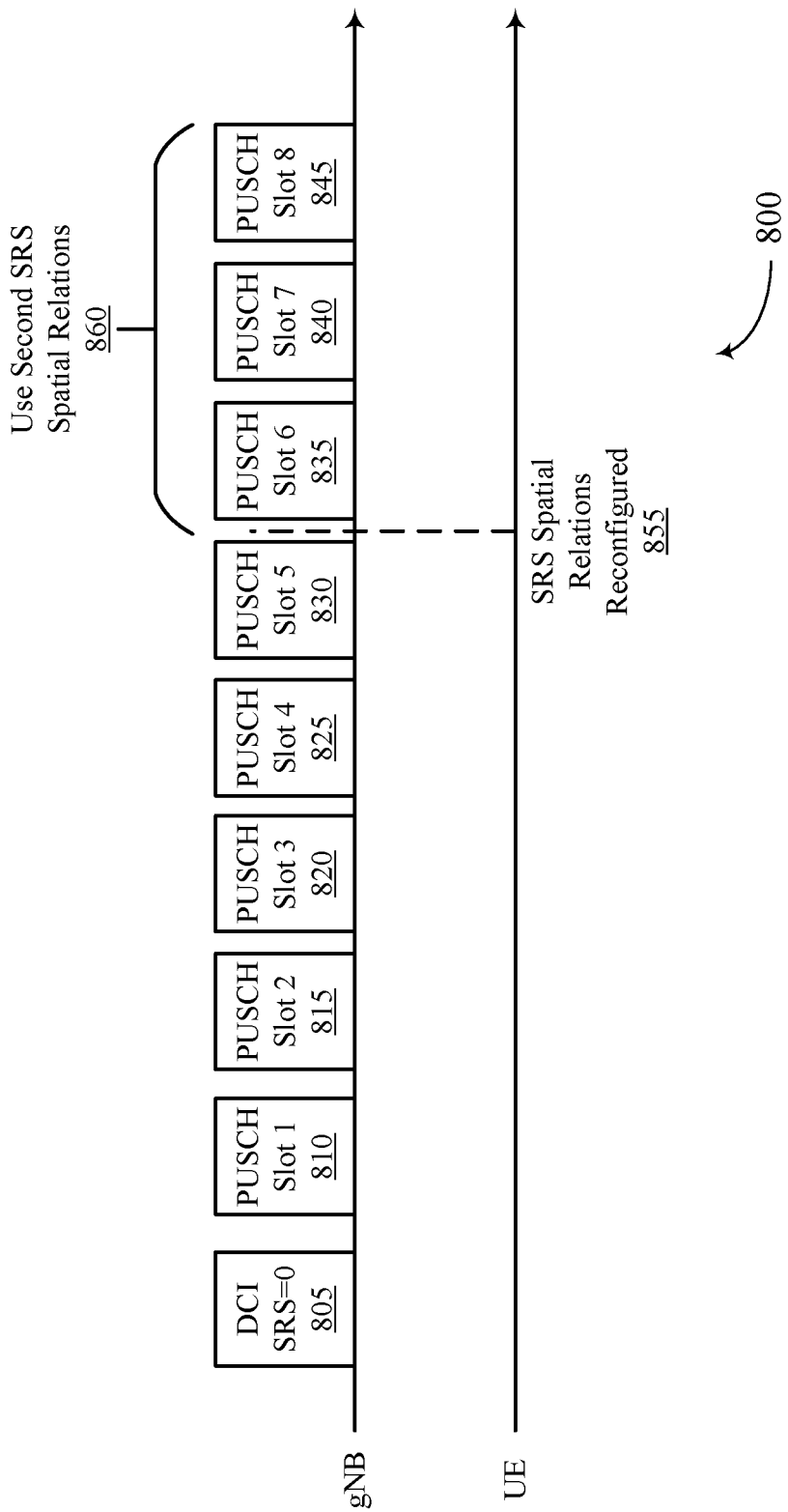
FIG. 8 illustrates an example of a slot configuration that supports candidate TCI states for slot aggregation, in accordance with one or more aspects of the present disclosure.

FIG. 8 illustrates an example of a slot configuration 800 that supports candidate TCI states for slot aggregation, in accordance with one or more aspects of the present disclosure. In some examples, slot configuration 800 may implement aspects of wireless communications system 100. Aspects of slot configuration 800 are described with respect to a base station (e.g., gNB, network device, and the like) and a UE, which may be examples of the corresponding devices described herein. Generally, slot configuration 800 illustrates a multi-slot uplink transmission scheme implemented according to aspects of the described techniques.

Generally, various communication parameters are configured between the base station and UE to support uplink transmissions. One example of such parameters may include one or more spatial relations configured by the base station for the uplink transmission. Generally, the spatial relation may refer to a set of parameters that define spatial aspects for the uplink transmission, e.g., identifies a transmit beam, a receive beam, a beam identifier, a beam configuration, a beam direction, an angle of arrival, an angle of departure, and the like. Other parameters for the uplink transmission may also be defined.

In one aspect, the base station may configure a set of candidate resource indices for the UE. For example, the base station may configure 2, 4, 8, or some other number of candidate resource indices for the UE, with each resource index having its own associated parameters (e.g., a corresponding spatial relation). Accordingly, when the base station schedules an uplink transmission to the UE, it may provide an indication of which resource index is to be used (e.g., which SRS index) for the uplink transmission. As one example, the DCI scheduling the uplink transmission may include one or more bits (e.g., depending upon the number of candidate resource indices) or a field that is set to correspond to a particular resource index.

However, the base station may reconfigure the set of candidate resource indices, e.g., periodically, as-needed, etc. For example, due to UE mobility, interference, blocking, etc., the base station may reconfigure each spatial relation for the corresponding resource indices. More particularly, the resource indices may not change (e.g., the resource indices may remain 0-7, in the example where eight candidate resource indices are configured). However, the spatial relation that corresponds to each resource index may be updated or changed during the reconfiguration from the base station. As one example, resource index 0 (SRS=0) may correspond to a first spatial relation before the reconfiguration or change, but may correspond to a second spatial relation after the reconfiguration or change. Using this technique, the base station may still be able to set the one or more bits or fields within the DCI scheduling the uplink transmission to a value corresponding to a resource index, but after the reconfiguration or change the spatial relation that is associated with that resource index is different.

This reconfiguration may include the base station transmitting (and the UE receiving) a signal (not shown) that reconfigures the set of candidate resource indices from a first set of spatial relations to a second set of spatial relations. Generally, the signal may include a higher layer signaling, such as an RRC signaling, a MAC CE, or other higher layer signaling, or may use a DCI field. The UE receives and decodes the signal from the base station and responds with an ACK signal (not shown) to the base station that confirms that the signal was successfully decoded. However, processing delays within the UE may result in an SRS reconfiguration period which generally illustrates the time between when the ACK signal is transmitted until when the SRS spatial relation reconfiguration 855 is completed. In one non-limiting example, the SRS spatial relation reconfiguration 855 may occur at a multiple of the slot timing, e.g., so as to occur between slots rather than during a slot.

During the SRS spatial relation reconfiguration period, an uplink transmission may begin between the base station and the UE. For example, the base station may transmit a DCI 705 that schedules a multi-slot uplink transmission from the UE to the base station. The multi-slot uplink transmission may span more than one slot, with eight slots being shown in slot configuration 800 by way of example only. Thus, the uplink transmission may span PUSCH slots 810, 815, 820, 825, 830, 835, 840, and/or 845. The DCI 805 may generally include one or more bits or fields (e.g., a code point field) that is set to a value that corresponds to a particular resource index. In the example slot configuration 800, the DCI 805 indicates that resource index 0 (SRS=0) is to be used for the multi-slot uplink transmission.

However, as the DCI 805 is received before the SRS spatial relation reconfiguration 855, resource index 0 corresponds to a first spatial relation (e.g., as was previously configured by the base station). However, during the uplink transmission (e.g., between the time when DCI 805 schedules the multi-slot uplink transmission and the PUSCH slots that carry the uplink data, control, and/or reference signal), the UE may determine that the mapping for the resource index is changed from corresponding to the first spatial relation (e.g., the old SRS spatial relation) to now correspond to the second spatial relation (e.g., the new SRS spatial relation updated by SRS spatial relation configuration signal).

Accordingly, aspects of the described techniques provide a mechanism where the UE chooses, identifies, or otherwise selects either the first spatial relation and/or the second spatial relation to use during the uplink transmission (e.g., to transmit the uplink transmission). That is, the uplink transmission is generally still associated with resource index 0, but the corresponding spatial relation for resource index 0 has been changed by the SRS spatial relation reconfiguration signal, with the reconfiguration completed during the uplink transmission (e.g., at the SRS spatial relation reconfiguration 855). Accordingly, the UE must now determine whether to utilize the old spatial relation (e.g., the first spatial relation) or the changed or updated spatial relation (e.g., the second spatial relation) to transmit some or all of the PUSCH slots 810-845. In accordance with aspects of the described techniques, the UE may select the first spatial relation to use during the slots occurring before the determined change (e.g., PUSCH slots 810-830) and select the second spatial relation to use during the slots 860 to use for the PUSCH slots carrying the uplink data, control, and/or reference signals (e.g., PUSCH slots 835-845). Accordingly, the UE may transmit the uplink transmission (e.g., the PUSCH slots 810-845) according to the first spatial relation (e.g., as selected for PUSCH slots 810-830) and according to the second spatial relation (e.g., as selected for PUSCH slots 835-845) and the resource index indicated in the DCI 805. Thus, the UE may select the first spatial relation to use during a first subset of PUSCH slots (e.g., PUSCH slots 810-830) and select the second spatial relation to use during a second subset of PUSCH slots (e.g., PUSCH slots 835-845) of the multi-slot uplink transmission.

In some aspects, PUSCH in each slot after reconfiguration uses the new candidate SRS spatial relations in that slot, if reconfiguration time happens in the duration from DCI 805 to the last slot (e.g., slot 8). That is, the spatial relation of the indicated SRI index for each slot with scheduled PUSCH may be based on the candidate SRS spatial relations in that slot. Aspects of slot configuration 800 may be used by UEs unable to store old candidate SRS spatial relations.

Figure 9:
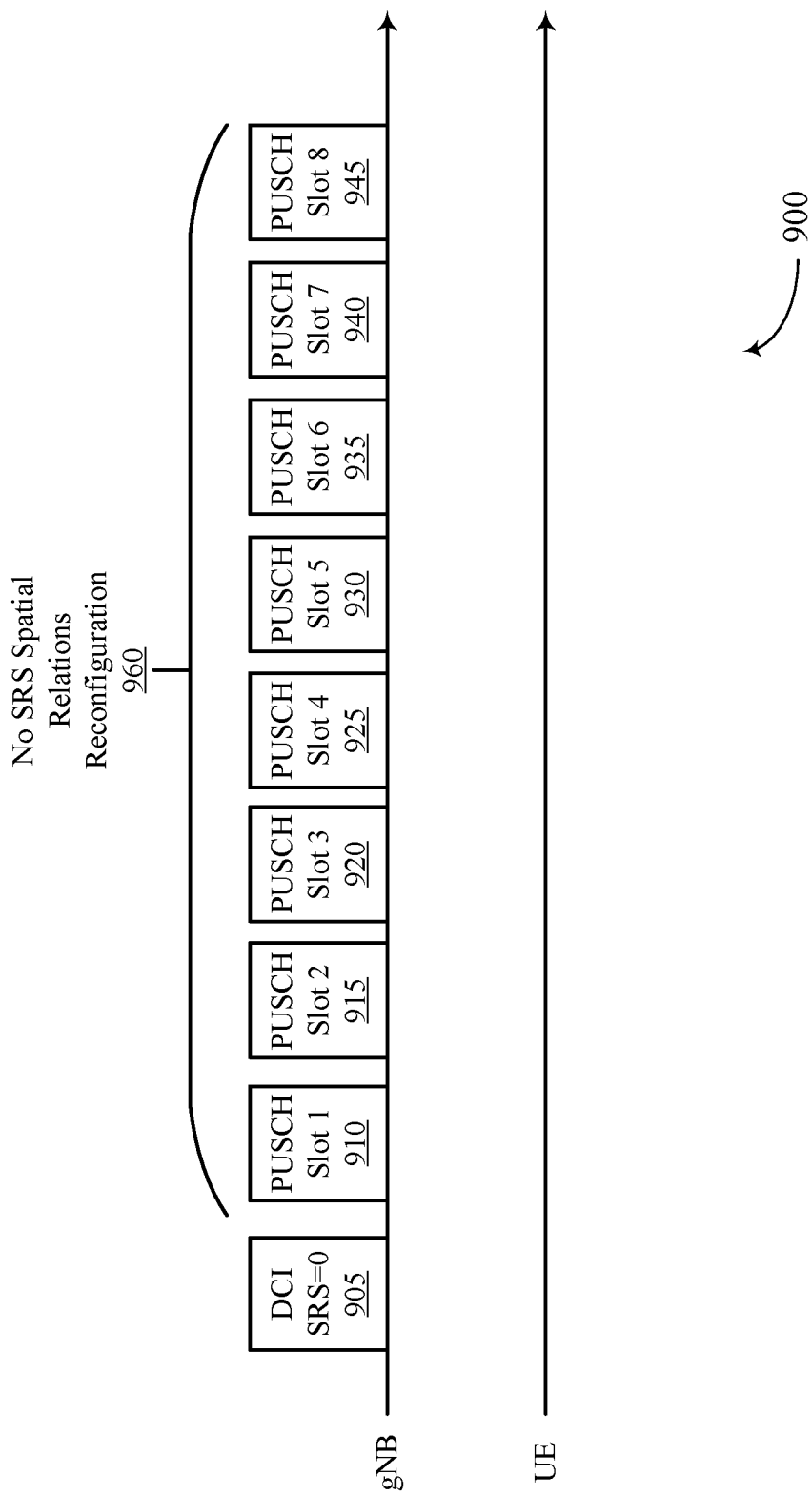
FIG. 9 illustrates an example of a slot configuration that supports candidate TCI states for slot aggregation, in accordance with one or more aspects of the present disclosure.

FIG. 9 illustrates an example of a slot configuration 900 that supports candidate TCI states for slot aggregation, in accordance with one or more aspects of the present disclosure. In some examples, slot configuration 900 may implement aspects of wireless communications system 100. Aspects of slot configuration 900 are described with respect to a base station (e.g., gNB, network device, etc.) and a UE, which may be examples of the corresponding devices described herein. Generally, slot configuration 900 illustrates a multi-slot uplink transmission scheme implemented according to aspects of the described techniques.

Generally, various communication parameters are configured between the base station and UE to support uplink transmissions. One example of such parameters may include one or more SRSs configured by the base station for the uplink transmission. Generally, the SRSs (or SRS spatial relation, or simply spatial relation) may refer to a set of parameters that define spatial aspects for the uplink transmission, e.g., identifies a transmit beam, a receive beam, a beam identifier, a beam configuration, a beam direction, an angle of arrival, an angle of departure, and the like. Other parameters for the uplink transmission may also be defined.

In one aspect, the base station may configure a set of candidate resource indices for the UE (e.g., SRS indices, PUCCH indices, etc.). For example, the base station may configure 2, 4, 8, or some other number of candidate resource indices for the UE, with each resource index having its own associated parameters (e.g., a corresponding spatial relation). Accordingly, when the base station schedules an uplink transmission to the UE, it may provide an indication of which SRS is to be used (e.g., which resource index) for the uplink transmission. As one example, the DCI scheduling the uplink transmission may include one or more bits (e.g., depending upon the number of candidate resources indices) or a field that is set to correspond to a particular resource index.

However, the base station may reconfigure the set of candidate resources indices, e.g., periodically, as-needed, etc. For example, due to UE mobility, interference, blocking, etc., the base station may reconfigure each spatial relation for the corresponding resource indices. More particularly, the resource indices may not change (e.g., the resource indices may remain 0-7, in the example where eight candidate resource indices are configured). However, the spatial relation that corresponds to each resource index may be updated or changed during the reconfiguration from the base station. As one example, resource index 0 (SRS=0) may correspond to a first spatial relation before the reconfiguration or change, but may correspond to a second spatial relation after the reconfiguration or change. Using this technique, the base station may still be able to set the one or more bits or fields within the DCI scheduling the uplink transmission to a value corresponding to a particular resource index, but after the reconfiguration or change the spatial relation that is associated with that resource index is different.

This reconfiguration may include the base station transmitting (and the UE receiving) a signal (not shown) that reconfigures the set of candidate resource indices from a first set of spatial relations to a second set of spatial relations. Generally, the signal may include a higher layer signaling, such as an RRC signaling, a MAC CE, or other higher layer signaling, or may use a DCI field. The UE receives and decodes the signal from the base station and responds with an ACK signal (not shown) to the base station that confirms that the signal was successfully decoded. However, processing delays within the UE may result in an SRS reconfiguration period which generally includes the time between when the ACK signal is transmitted until when the SRS spatial relation reconfiguration is completed. In one non-limiting example, the SRS spatial relation reconfiguration may occur at a multiple of the slot timing, e.g., so as to occur between slots rather than during a slot.

During the SRS spatial relation reconfiguration period, an uplink transmission may begin between the base station and the UE. For example, the base station may transmit a DCI 905 that schedules a multi-slot uplink transmission from the UE to the base station. The multi-slot uplink transmission may span more than one slot, with eight slots being shown in slot configuration 900 by way of example only. Thus, the uplink transmission may span PUSCH slots 910, 915, 920, 925, 930, 935, 940, and/or 945. The DCI 905 may generally include one or more bits or fields (e.g., a code point field) that is set to a value that corresponds to a particular resource index. In the example slot configuration 900, the DCI 905 indicates that resource index 0 (SRS=0) is to be used for the multi-slot uplink transmission.

However, as the DCI 905 is received before the SRS spatial relation reconfiguration, resource index 0 corresponds to a first spatial relation (e.g., as was previously configured by the base station). However, during the uplink transmission (e.g., between the time when DCI 905 schedules the multi-slot uplink transmission and the PUSCH slots that carry the uplink data, control, and/or reference signals), the UE may determine that the mapping for the resource index is changed from corresponding to the first spatial relation (e.g., the old SRS spatial relation) to now correspond to the second spatial relation (e.g., the new SRS spatial relation updated by SRS spatial relation configuration signal).

Accordingly, aspects of the described techniques provide a mechanism where the UE chooses, identifies, or otherwise selects either the first spatial relation and/or the second spatial relation to use during the uplink transmission (e.g., to transmit the uplink transmission). That is, the uplink transmission is generally still associated with resource index 0, but the corresponding spatial relation for resource index 0 has been changed by the SRS spatial relation reconfiguration signal, with the reconfiguration completed during the uplink transmission (e.g., at the SRS spatial relation reconfiguration 755). Accordingly, the UE must now determine whether to utilize the old spatial relation (e.g., the first spatial relation) or the changed or updated spatial relation (e.g., the second spatial relation) to transmit some or all of the PUSCH slots 910-945. In accordance with aspects of the described techniques, the UE may select the first spatial relation during the slots 960 to use for the PUSCH slots carrying the uplink data, control, and/or reference signals. Accordingly, the UE may transmit the uplink transmission (e.g., the PUSCH slots 910-945) according to the first spatial relation (e.g., as selected) and the resource index indicated in the DCI 905. Thus, the UE may select the first spatial relation to use during each PUSCH slot of the multi-slot uplink transmission that occurs after decoding the DCI 905 scheduling the multi-slot uplink transmission. Moreover, the UE may ignore the SRS spatial relation reconfiguration during the uplink transmission. That is, the UE may refrain from updating the mapping between the resource index and the spatial relation during the uplink transmission. Instead, the UE may implement the SRS spatial relation reconfiguration for the next uplink transmission scheduled by the base station.

In some aspects, the reconfiguration time of the candidate SRS spatial relations is not allowed in the duration from DCI 905 to the last slot (e.g., slot 8). In some aspects, this may include not allowing the SRS spatial relations in the duration from the first PUSCH slot 910 to the last PUSCH slot 945.

Figure 10:
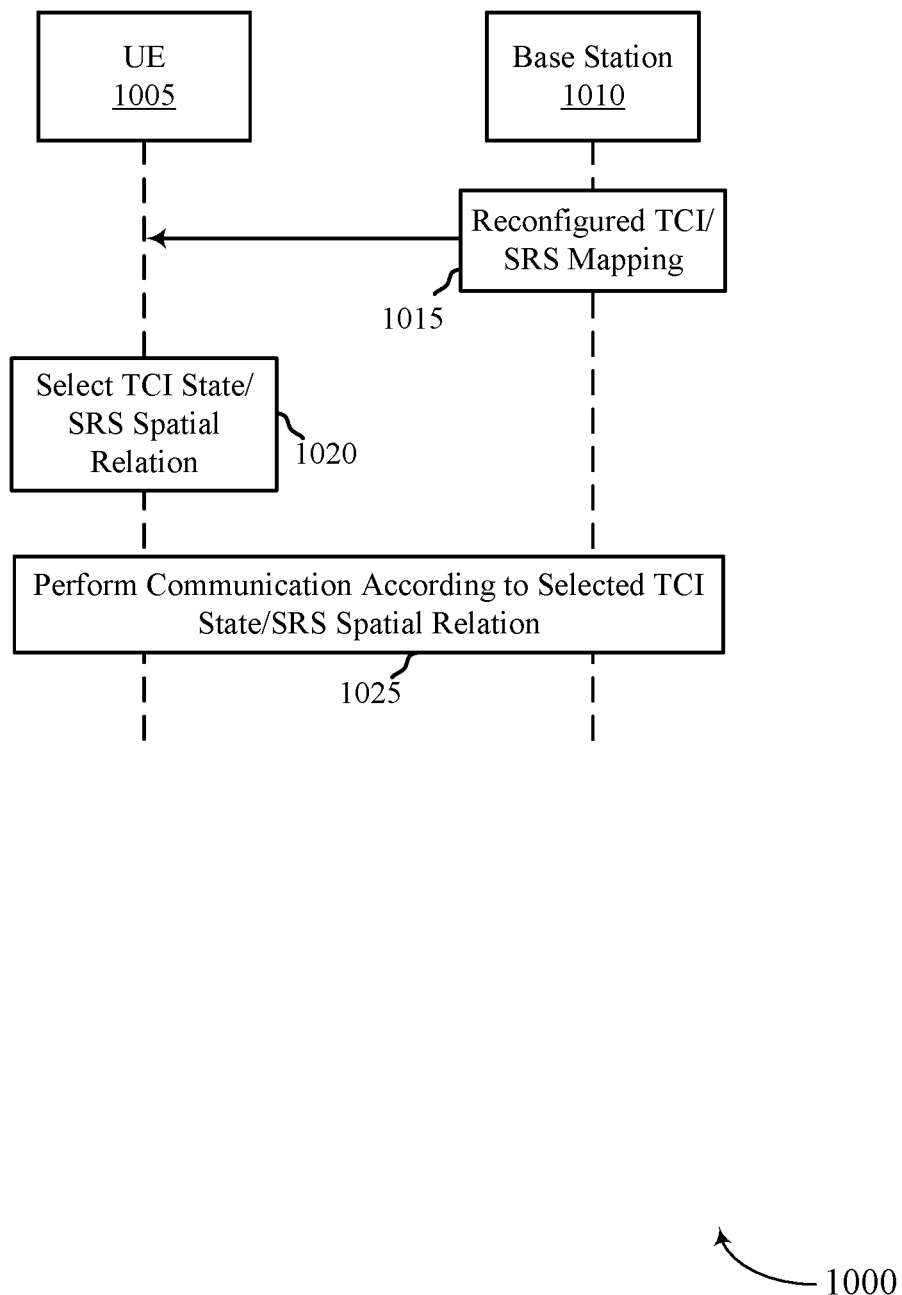
FIG. 10 illustrates an example of a process that supports candidate TCI states for slot aggregation, in accordance with one or more aspects of the present disclosure.

FIG. 10 illustrates an example of a process 1000 that supports candidate TCI states for slot aggregation, in accordance with one or more aspects of the present disclosure. In some examples, process 1000 may implement aspects of wireless communications system 100 and/or slot configurations 200-900. Aspects of process 1000 may be implemented by UE 1005 and/or base station 1010, which may be examples of the corresponding devices described herein.

At 1015, base station 1010 may perform a reconfiguration procedure. Generally, the reconfiguration procedure may be performed by base station 1010 transmitting (and UE 1005 receiving) a signal that carries or otherwise conveys an indication of the reconfiguration procedure. In some aspects, the signal may include a higher layer signaling, such as an RRC signal, a MAC CE signal, and the like. In other aspects, the signal may include a DCI field.

In some aspects, the reconfiguration procedure may map a TCI state index from a first TCI state configuration to a second TCI state configuration. In some aspects, this may include UE 1005 determining, during a multi-slot downlink transmission, that the mapping from the TCI state index from the first TCI state configuration is changed to the second TCI state configuration. In some aspects, this may include UE 1005 selecting the first TCI state configuration to use during each slot of the multi-slot downlink transmission. In some aspects, the first TCI state configuration may be determined based at least in part on a first slot occurring after decoding a signal that schedules the multi-slot downlink transmission.

In some aspects, the reconfiguration procedure may map a resource index (e.g., SRS index) from a first spatial relation to a second spatial relation. In some aspects, this may include UE 1005 determining, during an uplink transmission, that the mapping for the resource index is changed from the first spatial relation to the second spatial relation.

At 1020, the UE may perform a selection according to the reconfiguration procedure. In some aspects, the UE may select the first TCI state configuration and/or the second TCI state configuration to use for at least a portion of the multi-slot downlink transmission. In some aspects, this may include UE selecting the first spatial relation or the second spatial relation to use for the uplink transmission.

At 1025, UE 1005 and base station 1010 may perform a wireless transmission according to the selection. In some aspects, this may include UE 1005 receiving the multi-slot downlink transmission during one or more slots according to the selected TCI state configuration and the TCI state index. In some aspects, this may include UE 1005 transmitting the uplink transmission according to the selected spatial relation and the resource index.

Figure 11:
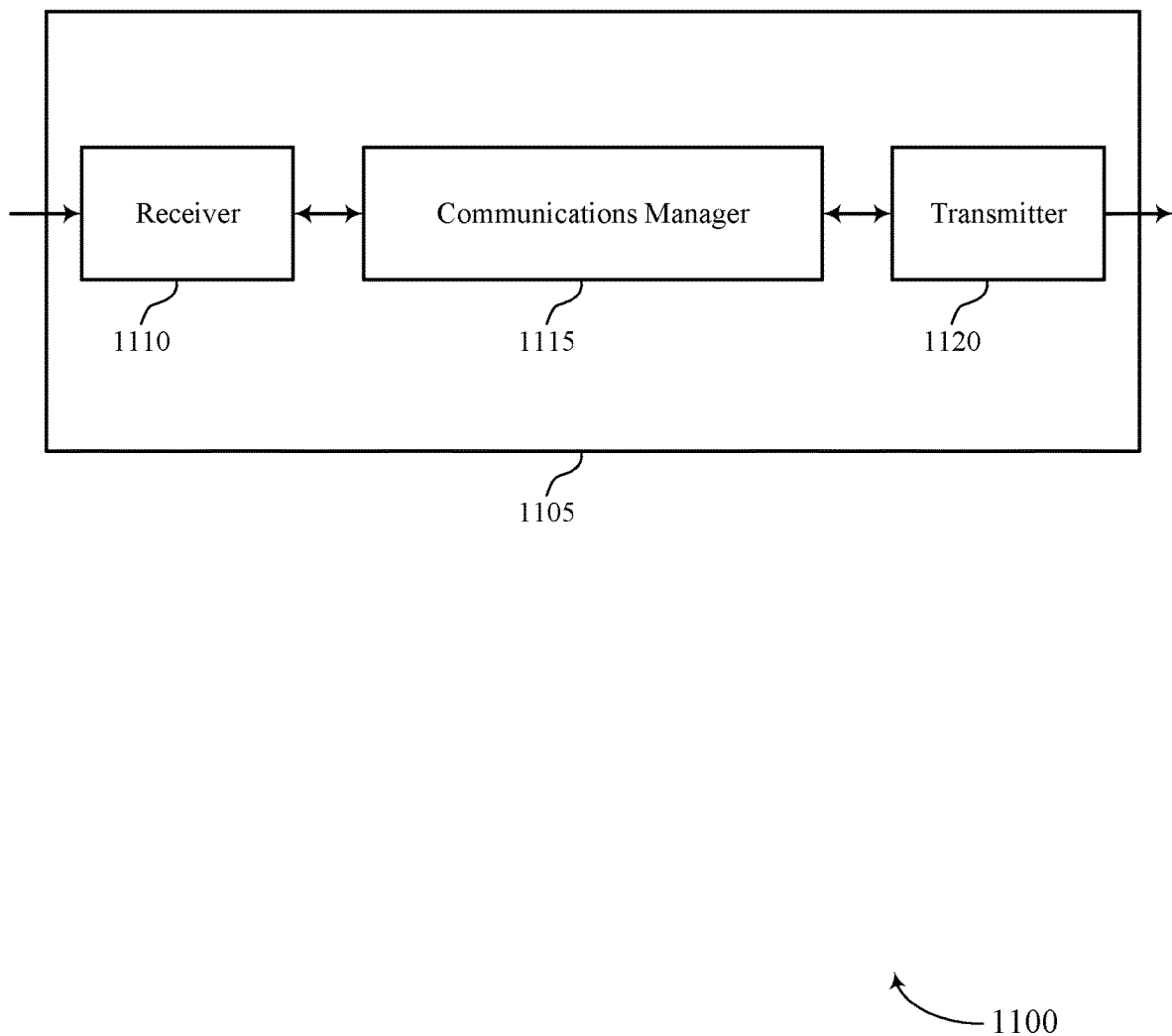
FIGS. 11 and 12 show block diagrams of devices that support candidate TCI states for slot aggregation, in accordance with one or more aspects of the present disclosure.

FIG. 11 shows a block diagram 1100 of a device 1105 that supports candidate TCI states for slot aggregation in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to candidate TCI states for slot aggregation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine, during a multi-slot downlink transmission, that a mapping from a TCI state index to a first TCI state configuration has changed to a second TCI state configuration, select, based on the determined change, the first TCI state configuration or the second TCI state configuration to use for at least a portion of the multi-slot downlink transmission, and receive the multi-slot downlink transmission during one or more slots according to the selected TCI state configuration and the TCI state index. The communications manager 1115 may also determine, during an uplink transmission, that a mapping from a resource index to a first spatial relation has changed to being mapped to a second spatial relation, select, based on the determined change, the first spatial relation or the second spatial relation to use for the uplink transmission, and transmit the uplink transmission according to the selected spatial relation and the resource index. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
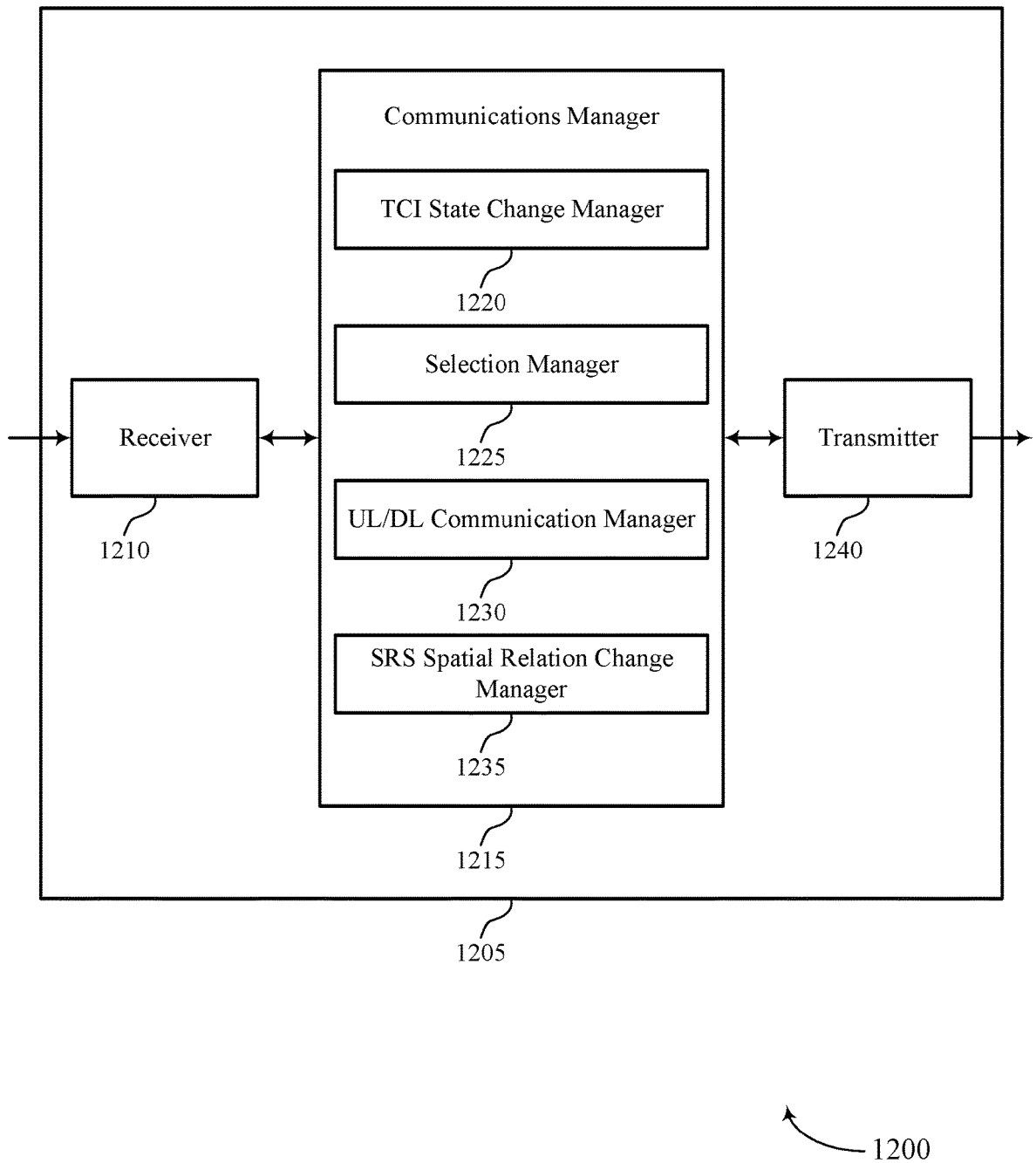

FIG. 12 shows a block diagram 1200 of a device 1205 that supports candidate TCI states for slot aggregation in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to candidate TCI states for slot aggregation, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a TCI state change manager 1220, a selection manager 1225, an UL/DL communication manager 1230, and a SRS spatial relation change manager 1235. The communications manager 1215 may be an example of aspects of the communications manager 1410 described herein.

The TCI state change manager 1220 may determine, during a multi-slot downlink transmission, that a mapping from a TCI state index to a first TCI state configuration has changed to a second TCI state configuration.

The selection manager 1225 may select, based on the determined change, the first TCI state configuration or the second TCI state configuration to use for at least a portion of the multi-slot downlink transmission.

The UL/DL communication manager 1230 may receive the multi-slot downlink transmission during one or more slots according to the selected TCI state configuration and the TCI state index.

The SRS spatial relation change manager 1235 may determine, during an uplink transmission, that a mapping from a resource index to a first spatial relation has changed to being mapped to a second spatial relation.

The selection manager 1225 may select, based on the determined change, the first spatial relation or the second spatial relation to use for the uplink transmission.

The UL/DL communication manager 1230 may transmit the uplink transmission according to the selected spatial relation and the resource index.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

In some aspects, the TCI state index may include a DCI level TCI state index indicated by DCI scheduling the multi-slot downlink transmission. In some aspects, the change in mapping is determined based at least in part on an indication received in a MAC CE. In some aspects, the first TCI state configuration and the second TCI state configuration are configured by RRC signaling and have corresponding RRC level TCI state indices.

Figure 13:
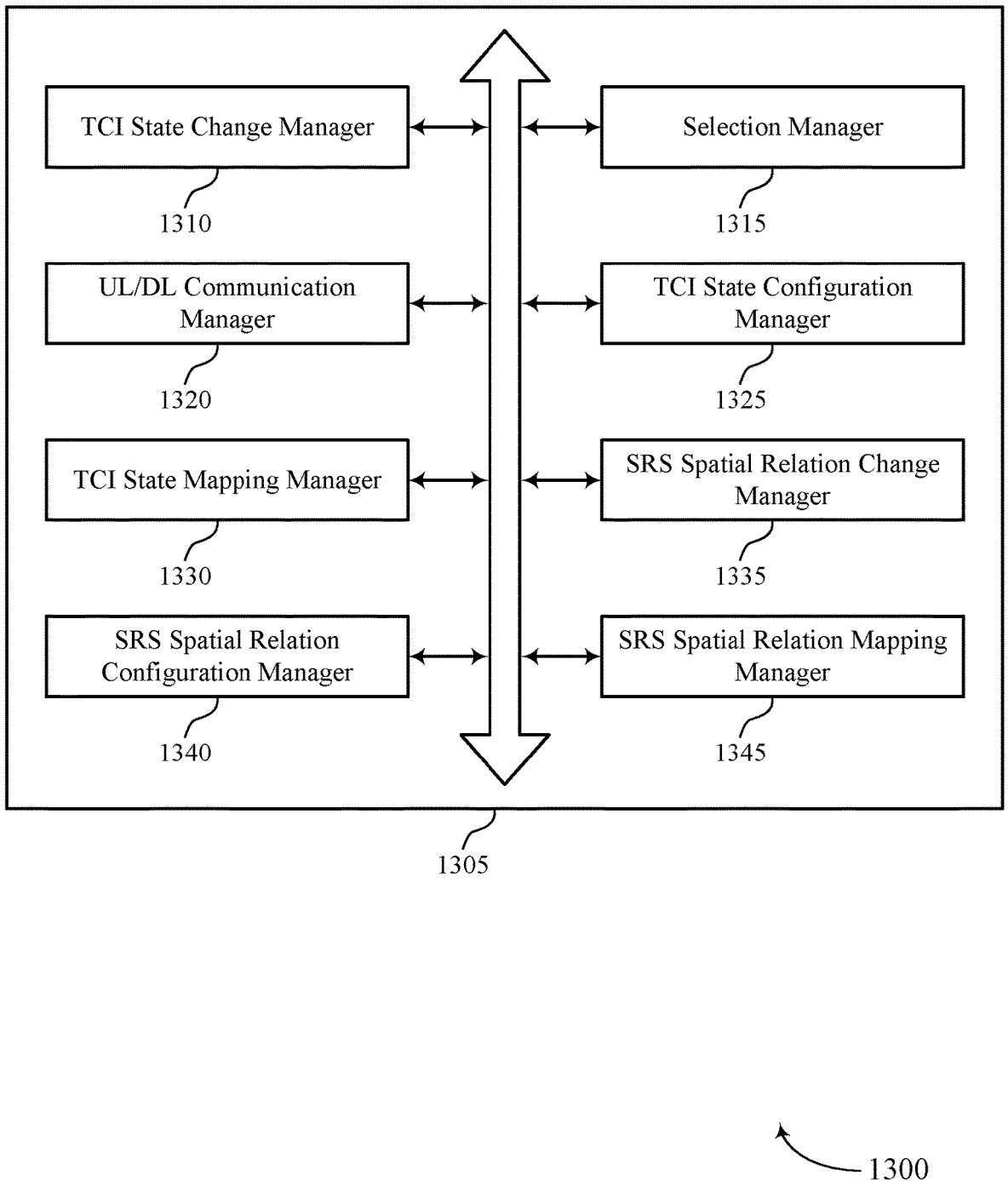
FIG. 13 shows a block diagram of a communications manager that supports candidate TCI states for slot aggregation, in accordance with one or more aspects of the present disclosure.

FIG. 13 shows a block diagram 1300 of a communications manager 1305 that supports candidate TCI states for slot aggregation in accordance with aspects of the present disclosure. The communications manager 1305 may be an example of aspects of a communications manager 1115, a communications manager 1215, or a communications manager 1410 described herein. The communications manager 1305 may include a TCI state change manager 1310, a selection manager 1315, an UL/DL communication manager 1320, a TCI state configuration manager 1325, a TCI state mapping manager 1330, a SRS spatial relation change manager 1335, a SRS spatial relation configuration manager 1340, and a SRS spatial relation mapping manager 1345. Each of these modules may communicate, directly or indirectly, with one another (e.g., via one or more buses).

The TCI state change manager 1310 may determine, during a multi-slot downlink transmission, that a mapping from a TCI state index to a first TCI state configuration has changed to a second TCI state configuration.

The selection manager 1315 may select, based on the determined change, the first TCI state configuration or the second TCI state configuration to use for at least a portion of the multi-slot downlink transmission. In some examples, the selection manager 1315 may select, based on the determined change, the first spatial relation or the second spatial relation to use for the uplink transmission.

The UL/DL communication manager 1320 may receive the multi-slot downlink transmission during one or more slots according to the selected TCI state configuration and the TCI state index. In some examples, the UL/DL communication manager 1320 may transmit the uplink transmission according to the selected spatial relation and the resource index. In some cases, the multi-slot downlink transmission includes at least one of a data transmission, a control transmission, a reference signal transmission, or a combination thereof. In some cases, the uplink transmission includes at least one of a data transmission, a control transmission, a reference signal transmission, or a combination thereof.

The SRS spatial relation change manager 1335 may determine, during an uplink transmission, that a mapping from a resource index to a first spatial relation has changed to being mapped to a second spatial relation.

The TCI state configuration manager 1325 may select the first TCI state configuration to use during each slot of the multi-slot downlink transmission.

In some examples, the TCI state configuration manager 1325 may select the first TCI state configuration to use during a first subset of slots of the multi-slot downlink transmission.

In some examples, the TCI state configuration manager 1325 may select the second TCI state configuration to use during a second subset of slots of the multi-slot downlink transmission, the first subset of slots occurring before the determined change and the second subset of slots occurring after the determined change.

In some examples, the TCI state configuration manager 1325 may determine that the determined change occurs during the multi-slot downlink transmission. In some examples, the TCI state configuration manager 1325 may refrain, based on the determined change occurring during the multi-slot downlink transmission, from implementing the determined change. In some cases, the first TCI state configuration is determined based on a first slot occurring after decoding a signal scheduling the multi-slot downlink transmission. In some cases, the first TCI state configuration is determined based on a slot containing a signal scheduling the multi-slot downlink transmission.

The TCI state mapping manager 1330 may receive a signal reconfiguring a set of candidate TCI state indices from a first set of TCI state configurations to a second set of TCI state configurations, where the determined change is based on the signal.

In some cases, the signal includes at least one of a MAC CE, an RRC signal, a DCI field, or a combination thereof.

The SRS spatial relation configuration manager 1340 may select the second spatial relation for the uplink transmission. In some examples, the SRS spatial relation configuration manager 1340 may select the first spatial relation to use during each slot of the uplink transmission. In some examples, the SRS spatial relation configuration manager 1340 may select the first spatial relation to use during a first subset of slots of the uplink transmission. In some examples, the SRS spatial relation configuration manager 1340 may select the second spatial relation to use during a second subset of slots of the uplink transmission, the first subset of slots occurring before the determined change and the second subset of slots occurring after the determined change.

In some examples, the SRS spatial relation configuration manager 1340 may determine that the determined change occurs during the uplink transmission. In some examples, the SRS spatial relation configuration manager 1340 may refrain, based on the determined change occurring during the uplink transmission, from implementing the determined change. In some cases, the first spatial relation is determined based on a first slot of the uplink transmission. In some cases, the first spatial relation is determined based on a slot containing a signal scheduling the uplink transmission. In some cases, the resource index includes at least one of an SRS index, a PUCCH resource, or a combination thereof.

The SRS spatial relation mapping manager 1345 may receive a signal reconfiguring a set of candidate resource indices from a first set of spatial relations to a second set of spatial relations, where the determined change is based on the signal.

In some cases, the signal includes at least one of a MAC CE, an RRC signal, a DCI field, or a combination thereof.

Figure 14:
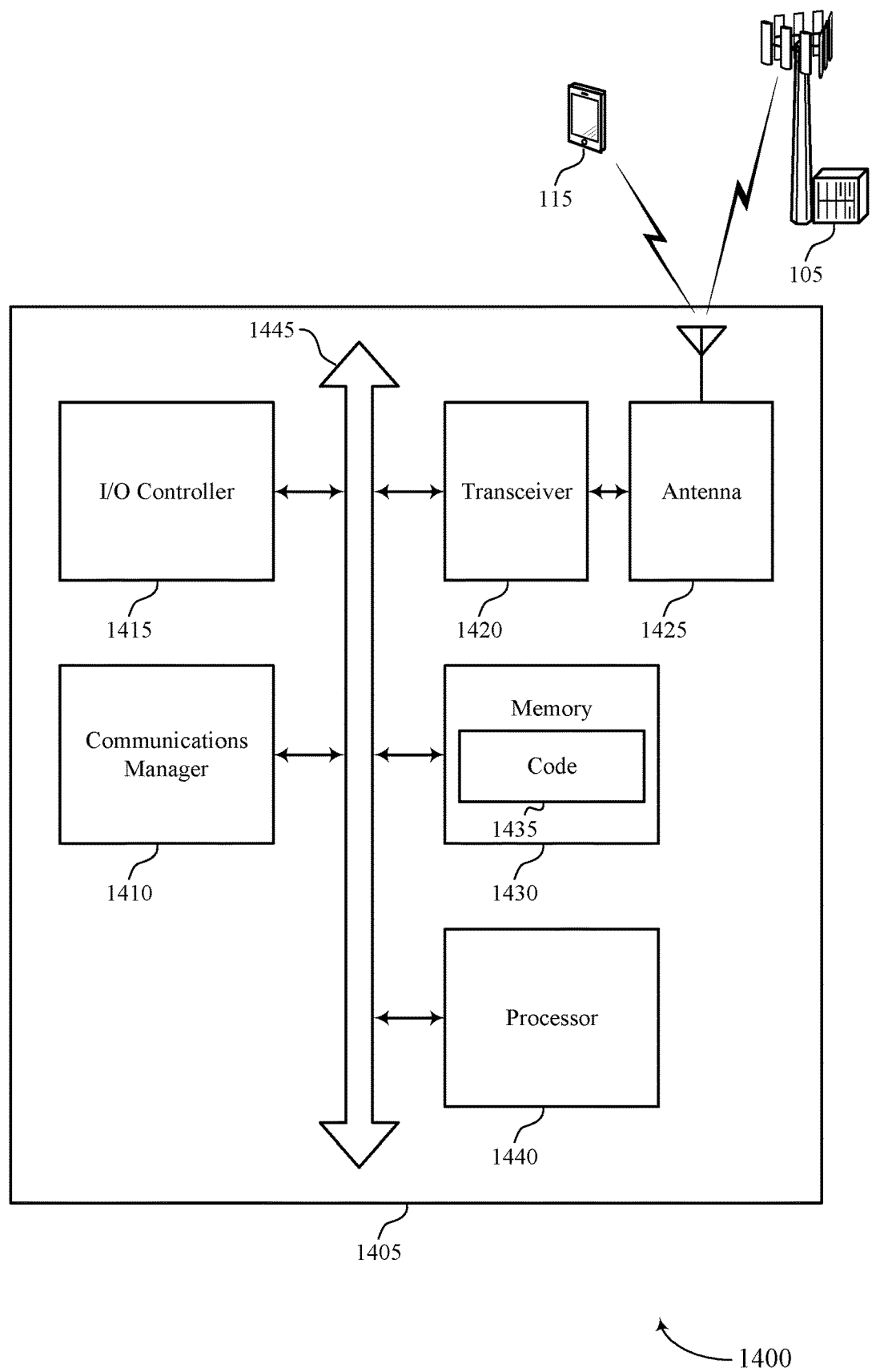
FIG. 14 shows a diagram of a system including a device that supports candidate TCI states for slot aggregation, in accordance with one or more aspects of the present disclosure.

FIG. 14 shows a diagram of a system 1400 including a device 1405 that supports candidate TCI states for slot aggregation in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may determine, during a multi-slot downlink transmission, that a mapping from a TCI state index to a first TCI state configuration has changed to a second TCI state configuration, select, based on the determined change, the first TCI state configuration or the second TCI state configuration to use for at least a portion of the multi-slot downlink transmission, and receive the multi-slot downlink transmission during one or more slots according to the selected TCI state configuration and the TCI state index. The communications manager 1410 may also determine, during an uplink transmission, that a mapping from a resource index to a first spatial relation has changed to being mapped to a second spatial relation, select, based on the determined change, the first spatial relation or the second spatial relation to use for the uplink transmission, and transmit the uplink transmission according to the selected spatial relation and the resource index.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM) and read only memory (ROM). The memory 1430 may store computer-readable, computer-executable code

1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting candidate TCI states for slot aggregation).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
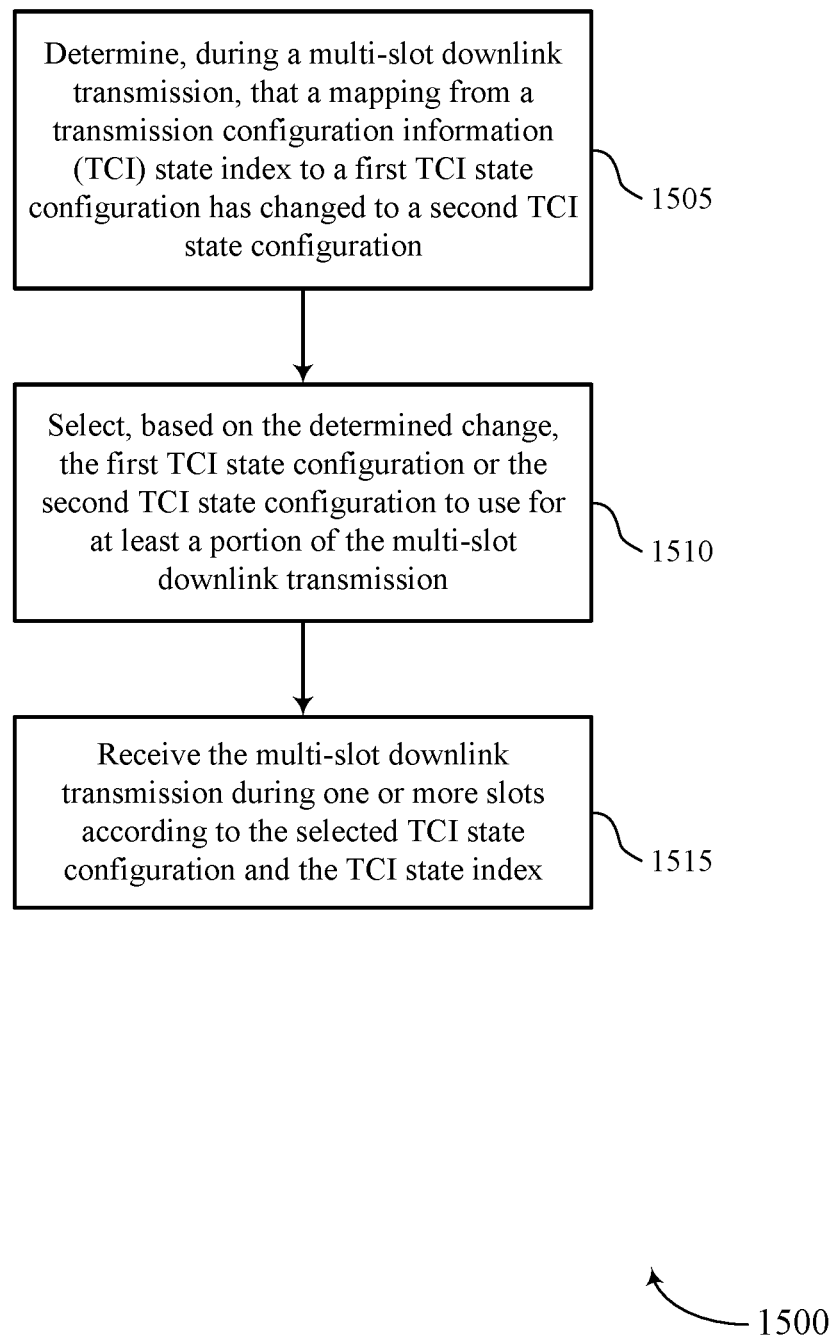
FIGS. 15 through 17 show flowcharts illustrating methods that support candidate TCI states for slot aggregation, in accordance with one or more aspects of the present disclosure.

FIG. 15 shows a flowchart illustrating a method 1500 that supports candidate TCI states for slot aggregation in accordance with aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1505, the UE may determine, during a multi-slot downlink transmission, that a mapping from a TCI state index to a first TCI state configuration has changed to a second TCI state configuration. The operations of 1505 may be performed according to the methods described herein. In some examples, aspects of the operations of 1505 may be performed by a TCI state change manager as described with reference to FIGS. 11 through 14.

At 1510, the UE may select, based on the determined change, the first TCI state configuration or the second TCI state configuration to use for at least a portion of the multi-slot downlink transmission. The operations of 1510 may be performed according to the methods described herein. In some examples, aspects of the operations of 1510 may be performed by a selection manager as described with reference to FIGS. 11 through 14.

At 1515, the UE may receive the multi-slot downlink transmission during one or more slots according to the selected TCI state configuration and the TCI state index. The operations of 1515 may be performed according to the methods described herein. In some examples, aspects of the operations of 1515 may be performed by an UL/DL communication manager as described with reference to FIGS. 11 through 14.

Figure 16:
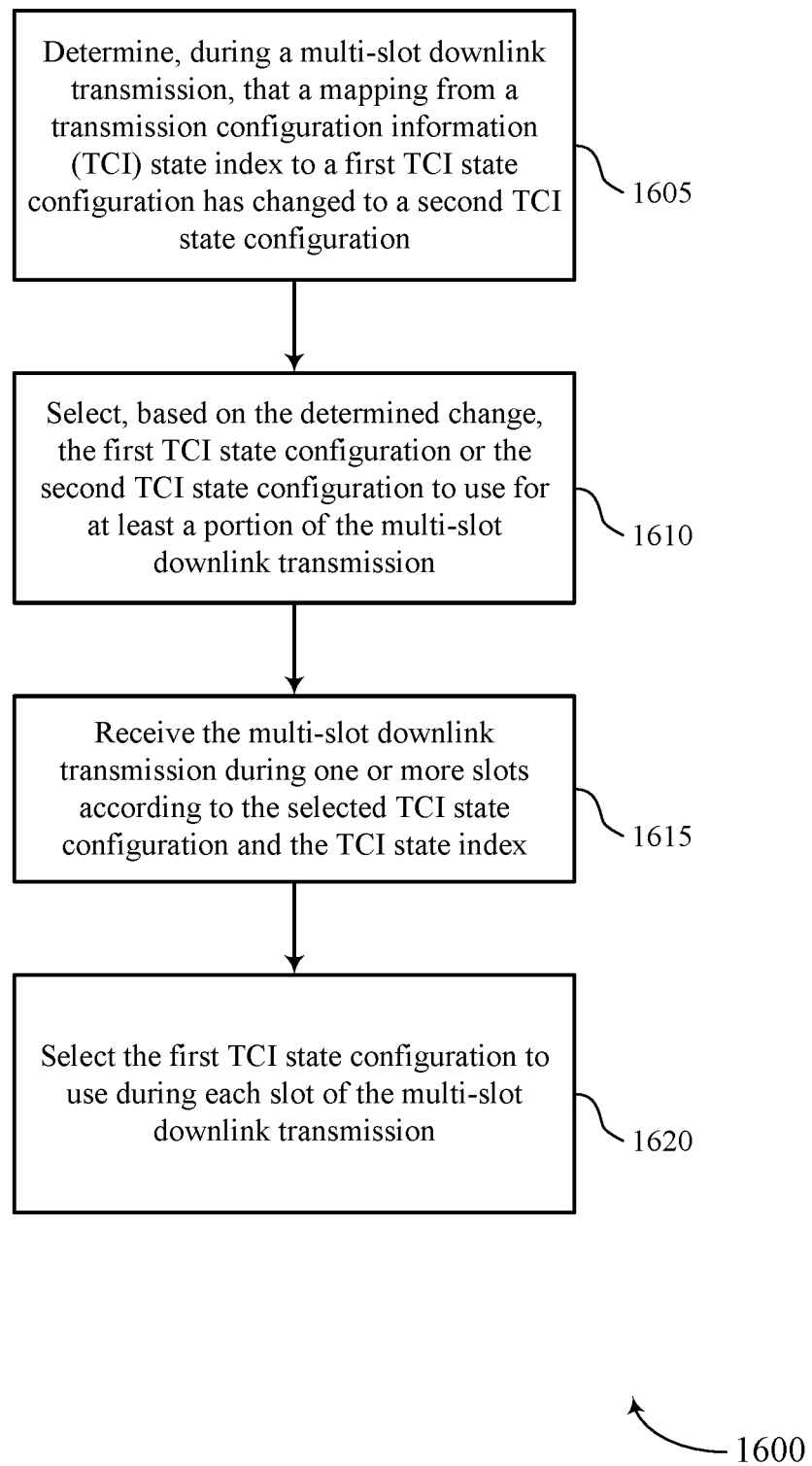

FIG. 16 shows a flowchart illustrating a method 1600 that supports candidate TCI states for slot aggregation in accordance with aspects of the present disclosure. The operations of method 1600 may be implemented by a UE 115 or its components as described herein. For example, the operations of method 1600 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1605, the UE may determine, during a multi-slot downlink transmission, that a mapping from a TCI state index to a first TCI state configuration has changed to a second TCI state configuration. The operations of 1605 may be performed according to the methods described herein. In some examples, aspects of the operations of 1605 may be performed by a TCI state change manager as described with reference to FIGS. 11 through 14.

At 1610, the UE may select, based on the determined change, the first TCI state configuration or the second TCI state configuration to use for at least a portion of the multi-slot downlink transmission. The operations of 1610 may be performed according to the methods described herein. In some examples, aspects of the operations of 1610 may be performed by a selection manager as described with reference to FIGS. 11 through 14.

At 1615, the UE may receive the multi-slot downlink transmission during one or more slots according to the selected TCI state configuration and the TCI state index. The operations of 1615 may be performed according to the methods described herein. In some examples, aspects of the operations of 1615 may be performed by an UL/DL communication manager as described with reference to FIGS. 11 through 14.

At 1620, the UE may select the first TCI state configuration to use during each slot of the multi-slot downlink transmission. The operations of 1620 may be performed according to the methods described herein. In some examples, aspects of the operations of 1620 may be performed by a TCI state configuration manager as described with reference to FIGS. 11 through 14.

Figure 17:
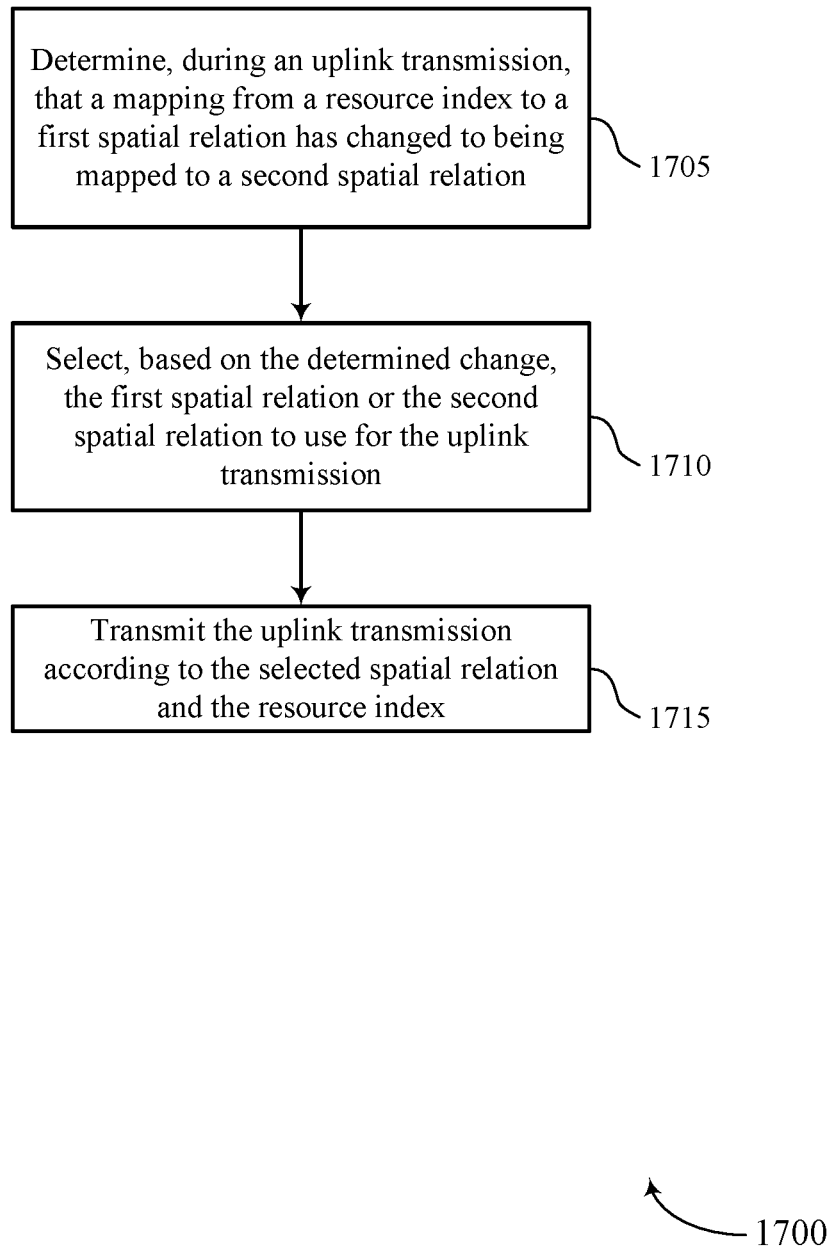

FIG. 17 shows a flowchart illustrating a method 1700 that supports candidate TCI states for slot aggregation in accordance with aspects of the present disclosure. The operations of method 1700 may be implemented by a UE 115 or its components as described herein. For example, the operations of method 1700 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1705, the UE may determine, during an uplink transmission, that a mapping from a resource index to a first spatial relation has changed to being mapped to a second spatial relation. The operations of 1705 may be performed according to the methods described herein. In some examples, aspects of the operations of 1705 may be performed by an SRS spatial relation change manager as described with reference to FIGS. 11 through 14.

At 1710, the UE may select, based on the determined change, the first spatial relation or the second spatial relation to use for the uplink transmission. The operations of 1710 may be performed according to the methods described herein. In some examples, aspects of the operations of 1710 may be performed by a selection manager as described with reference to FIGS. 11 through 14.

At 1715, the UE may transmit the uplink transmission according to the selected spatial relation and the resource index. The operations of 1715 may be performed according to the methods described herein. In some examples, aspects of the operations of 1715 may be performed by an UL/DL communication manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining, during an uplink transmission, that a mapping from a resource index to a first spatial relation has changed to being mapped to a second spatial relation;
   selecting, based at least in part on the determined change, the first spatial relation or the second spatial relation to use for the uplink transmission; and
   transmitting the uplink transmission according to the selected spatial relation and the resource index.

2. The method of claim 1, wherein at least the first spatial relation and the spatial relation are activated spatial relations, and the activated spatial relations remain unchanged during each slot of a multi-slot uplink transmission.

3. The method of claim 1, wherein at least the first spatial relation and the spatial relation are activated spatial relations, and the activated spatial relations are determined based on an initial slot of a multi-slot uplink transmission.

4. The method of claim 1, further comprising:
   determining that a spatial relation is configured at the UE that identifies a plurality of aggregated uplink transmissions for two or more consecutive slots of a multi-slot uplink transmission; and
   applying a same spatial relation for spatial transmission parameters for each of the two or more consecutive slots.

5. The method of claim 1, wherein the uplink transmission comprises a single slot uplink transmission, further comprising:
   selecting the second spatial relation for the uplink transmission.

6. The method of claim 1, further comprising:
   selecting the first spatial relation to use during each slot of the uplink transmission.

7. The method of claim 6, wherein the first spatial relation is determined based at least in part on a first slot of the uplink transmission.

8. The method of claim 6, wherein the first spatial relation is determined based at least in part on a slot containing a signal scheduling the uplink transmission.

9. The method of claim 1, further comprising:
   selecting the first spatial relation to use during a first subset of slots of the uplink transmission; and
   selecting the second spatial relation to use during a second subset of slots of the uplink transmission, the first subset of slots occurring before the determined change and the second subset of slots occurring after the determined change.

10. The method of claim 1, further comprising:
    determining that the determined change occurs during the uplink transmission; and
    refraining, based at least in part on the determined change occurring during the uplink transmission, from implementing the determined change.

11. The method of claim 1, further comprising:
    receiving a signal reconfiguring a set of candidate resource indices from a first set of spatial relations to a second set of spatial relations, wherein the determined change is based at least in part on the signal.

12. The method of claim 11, wherein the signal comprises at least one of a medium access control (MAC) control element (CE), a radio resource control (RRC) signal, a downlink control information (DCI) field, or a combination thereof.

13. The method of claim 11, wherein the resource index comprises at least one of a sounding reference signal (SRS) index, a physical uplink control channel (PUCCH) resource, or a combination thereof.

14. The method of claim 1, wherein the uplink transmission comprises at least one of a data transmission, a control transmission, a reference signal transmission, or a combination thereof.

* * * * *